US008649597B2

(12) United States Patent
Shindo et al.

(10) Patent No.: US 8,649,597 B2
(45) Date of Patent: Feb. 11, 2014

(54) IMAGE PROCESSING APPARATUS AND CONTROL METHOD THEREOF DETECTING FROM A HISTOGRAM A GRADATION LEVEL WHOSE FREQUENCY IS A PEAK VALUE

(75) Inventors: Yuuki Shindo, Yokohama (JP); Izumi Kanai, Machida (JP); Tetsuji Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 615 days.

(21) Appl. No.: 12/821,699

(22) Filed: Jun. 23, 2010

(65) Prior Publication Data

US 2010/0329559 A1    Dec. 30, 2010

(30) Foreign Application Priority Data

Jun. 29, 2009 (JP) ................................. 2009-154139
Mar. 15, 2010 (JP) ................................. 2010-057700

(51) Int. Cl.
G06K 9/00 (2006.01)
G09G 5/02 (2006.01)
G09G 5/10 (2006.01)
H04N 1/40 (2006.01)

(52) U.S. Cl.
USPC ........... 382/168; 382/167; 345/596; 345/690; 358/3.01

(58) Field of Classification Search
None
See application file for complete search history.

(56) References Cited

U.S. PATENT DOCUMENTS

| 4,710,822 | A  | * | 12/1987 | Matsunawa ................... 382/172 |
| 5,386,302 | A  |   | 1/1995  | Kashihara et al. ............ 358/448 |
| 5,488,487 | A  |   | 1/1996  | Ojima et al. .................. 358/456 |
| 5,848,182 | A  |   | 12/1998 | Kanamori ..................... 382/171 |
| 5,953,450 | A  |   | 9/1999  | Kanamori ..................... 382/171 |
| 6,850,642 | B1 | * | 2/2005  | Wang ........................... 382/169 |
| 7,006,668 | B2 | * | 2/2006  | Iguchi et al. .................. 382/108 |
| 7,012,625 | B1 |   | 3/2006  | Kobayashi et al. ........... 345/690 |
| 7,436,413 | B2 |   | 10/2008 | Kanai ........................... 345/611 |
| 7,631,026 | B2 |   | 12/2009 | Kanai ........................... 708/270 |
| 7,636,472 | B2 |   | 12/2009 | Maruoka                              |
| 7,679,628 | B2 |   | 3/2010  | Kanai ........................... 345/691 |
| 7,903,148 | B2 |   | 3/2011  | Yokoyama et al.                      |
| 2001/0007599 | A1 | * | 7/2001 | Iguchi et al. .................. 382/274 |
| 2005/0058341 | A1 |   | 3/2005 | Maruoka                              |
| 2006/0215882 | A1 | * | 9/2006 | Ando et al. ................... 382/106 |
| 2006/0227396 | A1 |   | 10/2006 | Sugimoto et al. ............ 358/521 |

(Continued)

FOREIGN PATENT DOCUMENTS

| JP | 03-126377 | 5/1991 |
| JP | 06-350873 | 12/1994 |

(Continued)

*Primary Examiner* — Randolph I Chu

(74) *Attorney, Agent, or Firm* — Fitzpatrick, Cella, Harper & Scinto

(57) ABSTRACT

An image processing apparatus includes a histogram creation unit that creates a histogram from an input image, a detection unit that detects a gradation level of interest from the histogram, a gradation correction parameter generation unit that generates a gradation correction parameter to improve a gradation characteristic in a gradation range around the gradation level of interest, and a correction unit that corrects the gradation of the image using the gradation correction parameter. The detection unit detects, as the gradation level of interest, a gradation level whose frequency is a peak value equal to or more than a predetermined threshold, and which has variation width of frequencies in a predetermined range including this gradation level to be smaller than a predetermined width in the histogram.

26 Claims, 20 Drawing Sheets

(56) References Cited

U.S. PATENT DOCUMENTS

| | | |
|---|---|---|
| 2007/0177030 A1 | 8/2007 | Yokoyama et al. |
| 2007/0268534 A1* | 11/2007 | Duan et al. .................... 358/520 |
| 2007/0269132 A1* | 11/2007 | Duan et al. .................... 382/274 |
| 2008/0235313 A1 | 9/2008 | Kanai ........................... 708/400 |
| 2009/0141955 A1* | 6/2009 | Morita .......................... 382/128 |
| 2009/0219416 A1* | 9/2009 | Tsuruoka ...................... 348/241 |
| 2009/0262983 A1* | 10/2009 | Nakami ........................ 382/103 |
| 2009/0309996 A1* | 12/2009 | Iguchi et al. ............... 348/223.1 |
| 2010/0085361 A1* | 4/2010 | Kim et al. .................... 345/428 |
| 2010/0278423 A1* | 11/2010 | Itoh et al. ..................... 382/169 |
| 2011/0050934 A1* | 3/2011 | Mitsunaga ................. 348/222.1 |
| 2012/0154461 A1* | 6/2012 | Nishitani et al. .............. 345/690 |
| 2012/0162720 A1* | 6/2012 | Hayashi ...................... 358/3.24 |

FOREIGN PATENT DOCUMENTS

| | | |
|---|---|---|
| JP | 08-204963 | 8/1996 |
| JP | 2001-125535 | 5/2001 |
| JP | 2005-108208 | 4/2005 |
| JP | 2007-208399 | 8/2007 |

\* cited by examiner

FIG. 5

| GRADATION LEVEL | 0 | 1 | ... | 14 | 15 | 16 | 17 | 18 | ... |
|---|---|---|---|---|---|---|---|---|---|
| FREQUENCY | 0 | 0 | ... | 500 | 2500 | 12000 | 2000 | 1000 | ... |

| GRADATION LEVEL | ... | 30 | 31 | 32 | 33 | 34 | ... | 255 |
|---|---|---|---|---|---|---|---|---|
| FREQUENCY | ... | 2300 | 2700 | 3000 | 2600 | 2000 | ... | 0 |

FIG. 7A

| blk1 100 | blk2 70 | blk3 80 | blk4 128 |
|---|---|---|---|
| blk5 90 | blk6 25 | blk7 30 | blk8 128 |
| blk9 110 | blk10 35 | blk11 30 | blk12 100 |
| blk13 128 | blk14 85 | blk15 80 | blk16 100 |

FIG. 7B

| blk1 128 | blk2 230 | blk3 200 | blk4 128 |
|---|---|---|---|
| blk5 128 | blk6 200 | blk7 200 | blk8 128 |
| blk9 128 | blk10 180 | blk11 190 | blk12 128 |
| blk13 128 | blk14 128 | blk15 128 | blk16 128 |

FIG. 17A

| GRADATION LEVEL | 0 | 1 | 2 | 3 | 4 | ... | 255 |
|---|---|---|---|---|---|---|---|
| FREQUENCY | 3500 | 2800 | 2300 | 2000 | 1800 | ... | 0 |

FIG. 17B

| GRADATION LEVEL | 0 | 1 | 2 | 3 | 4 | ... | 255 |
|---|---|---|---|---|---|---|---|
| FREQUENCY | 3500 | 2800 | 3500 | 2000 | 1800 | ... | 0 |

IMAGE PROCESSING APPARATUS AND CONTROL METHOD THEREOF DETECTING FROM A HISTOGRAM A GRADATION LEVEL WHOSE FREQUENCY IS A PEAK VALUE

BACKGROUND OF THE INVENTION

1. Field of the Invention

The present invention relates to an image processing apparatus and a control method thereof.

2. Description of the Related Art

An image processing method, in which a gradation transformation processing (e.g. γ transformation processing) is executed depending on the characteristics of the input image signal, has been available (hereafter, this γ transformation processing is called "dynamic γ processing"). Such a method is disclosed in, for example, Japanese Patent Application Laid-Open Nos. H03-126377, H08-204963 and H06-350873.

In concrete terms, Japanese Patent Application Laid-Open No. H03-126377 discloses a method for creating a cumulative histogram based on a brightness histogram for one frame, and generating a γcurve from the cumulative histogram to perform dynamic γ processing. Japanese Patent Application Laid-Open Nos. H08-204963 and H06-350873 disclose a method for setting the reference values of a dark portion and a light portion based on peak values (frequency values to be a peak value) at a low gradation level side and a high gradation level side in the brightness histogram of the input image signal, and performing dynamic γ processing depending on the reference values being set. Japanese Patent Application Laid-Open No. 2001-125535 discloses a method for performing gradation correction for a gradation level with which the frequency becomes a predetermined upper limit or more, and a gradation level with which the frequency becomes a predetermined lower limit or less in the brightness histogram, using these frequencies as the upper limit and the lower limit respectively.

SUMMARY OF THE INVENTION

However, in the case of the conventional method for generating a γ curve from the cumulative histogram, the gradation characteristic is improved in a gradation range around the gradation level whose frequency is high. Therefore a gradation characteristic in a gradation range around a gradation level, with which the gradation characteristic should be improved (gradation level of an object in the image), may not be able to be improved very much if the frequency of this gradation level is not so high compared with the frequencies of other gradation levels.

For example, it is assumed that an image (input image signal) which includes a letterbox of which major gradation level is a gradation level a, an object B of which major gradation level is a gradation level b, and an object C of which major gradation level is a gradation level c, is input, as shown in FIG. 18A. If the frequency of the gradation level a in the brightness histogram is much higher than the frequencies of the gradation levels b and c, then a cumulative histogram, in which cumulative frequency changes greatly around the gradation level a and the cumulative frequency does not change much around the gradation levels b and c, is created. If a γ curve is generated based on such a cumulative histogram, the gradation characteristic is improved in the gradation range around the gradation level a, and the gradation characteristic is not improved very much in the gradation ranges around the gradation levels b and c.

The same is true for the method for setting the reference values for a dark portion and a light portion based on the peak values at the low gradation level side and the high gradation level side. For example, if an image includes areas having a single color (e.g. letterbox, graphics and characters of the data broadcast), the frequency of the gradation level in these areas increases in the brightness histogram (such a gradation level indicates a high peak value). As a result, it becomes impossible to set an optimum reference value and to generate an optimum γ curve, and hence the gradation characteristic cannot be improved in the gradation range around the gradation level which indicates a small peak value.

The same is true for the method for performing the gradation correction by limiting the frequency in the brightness histogram to a predetermined value. For example, it is assumed that an image shown in FIG. 18A is input. As FIG. 18B shows, if a frequency of the gradation level a of the letterbox exceeds the predetermined limit value in the brightness histogram obtained from this image, the frequency of the gradation level a is corrected to the predetermined limit value. As a result, a cumulative histogram shown in FIG. 18C (a histogram which is generated by accumulating the frequencies of the brightness histogram from the low gradation level side to the high gradation level side) is obtained. The frequency of the gradation level c is relatively higher than that of the gradation level b. Therefore if the frequency of the gradation level a is set to the limit value, a γ curve, that can improve the gradation characteristic in the gradation range around the gradation level a and in the gradation range around the gradation level c, can be generated. However even if this method is used, a γ curve, which improves the gradation characteristic in the gradation range around the gradation level whose frequency is relatively high, is generated, so the gradation characteristic in the gradation range around the gradation level whose frequency is relatively low is not improved very much. For example, in the case of the examples in FIG. 18A to FIG. 18C, the gradation characteristic in the gradation range around the gradation level b is not improved very much.

With the foregoing in view, the present invention provides a technology by which even if the frequency of a gradation level with which a gradation characteristic should be improved is relatively lower than the frequencies of other gradation levels, a gradation correction parameter for improving the gradation characteristic in a gradation range around the gradation level can be generated.

An image processing apparatus according to the present invention, comprising:

a histogram creation unit creates a histogram from an input image;

a detection unit detects a gradation level of interest from the histogram;

a gradation correction parameter generation unit generates a gradation correction parameter to improve a gradation characteristic in a gradation range around the gradation level of interest; and a correction unit corrects the gradation of the image using the gradation correction parameter, wherein the detection unit detects, as the gradation level of interest, a gradation level whose frequency is a peak value equal to or more than a predetermined threshold, and which has a variation width of frequencies in a predetermined range including this gradation level that is smaller than a predetermined width in the histogram.

A controlling method of an image processing apparatus according to the present invention, comprising the steps of:
creating a histogram from an input image;
detecting a gradation level of interest from the histogram;
generating a gradation correction parameter to improve a gradation characteristic in a gradation range around the gradation level of interest; and
correcting the gradation of the image using the gradation correction parameter, wherein
a gradation level whose frequency is a peak value equal to or more than a predetermined threshold, and which has variation width of frequencies in a predetermined range including this gradation level that is smaller than a predetermined width in the histogram, is detected as the gradation level of interest in the step of detecting.

According to the present invention, even if the frequency of a gradation level with which a gradation characteristic should be improved is relatively lower than the frequencies of other gradation levels, a technology to generate a gradation correction parameter to improve the gradation characteristic in a gradation range around the gradation level can be provided.

Further features of the present invention will become apparent from the following description of exemplary embodiments with reference to the attached drawings.

BRIEF DESCRIPTION OF THE DRAWINGS

FIG. 5 is a table showing each gradation level and frequency in the brightness histogram in FIG. 4;

FIG. 7A shows an example of a dark portion gradation level of interest in each area;

FIG. 7B shows an example of alight portion gradation level of interest in each area;

FIG. 17A shows an example of a histogram before processing by a histogram preprocessing unit;

FIG. 17B shows an example of a histogram after processing by a histogram preprocessing unit;

DESCRIPTION OF THE EMBODIMENTS

Example 1

Example 1 of an image processing device and control method thereof according to an embodiment of the present invention will be described.

Figure 1:
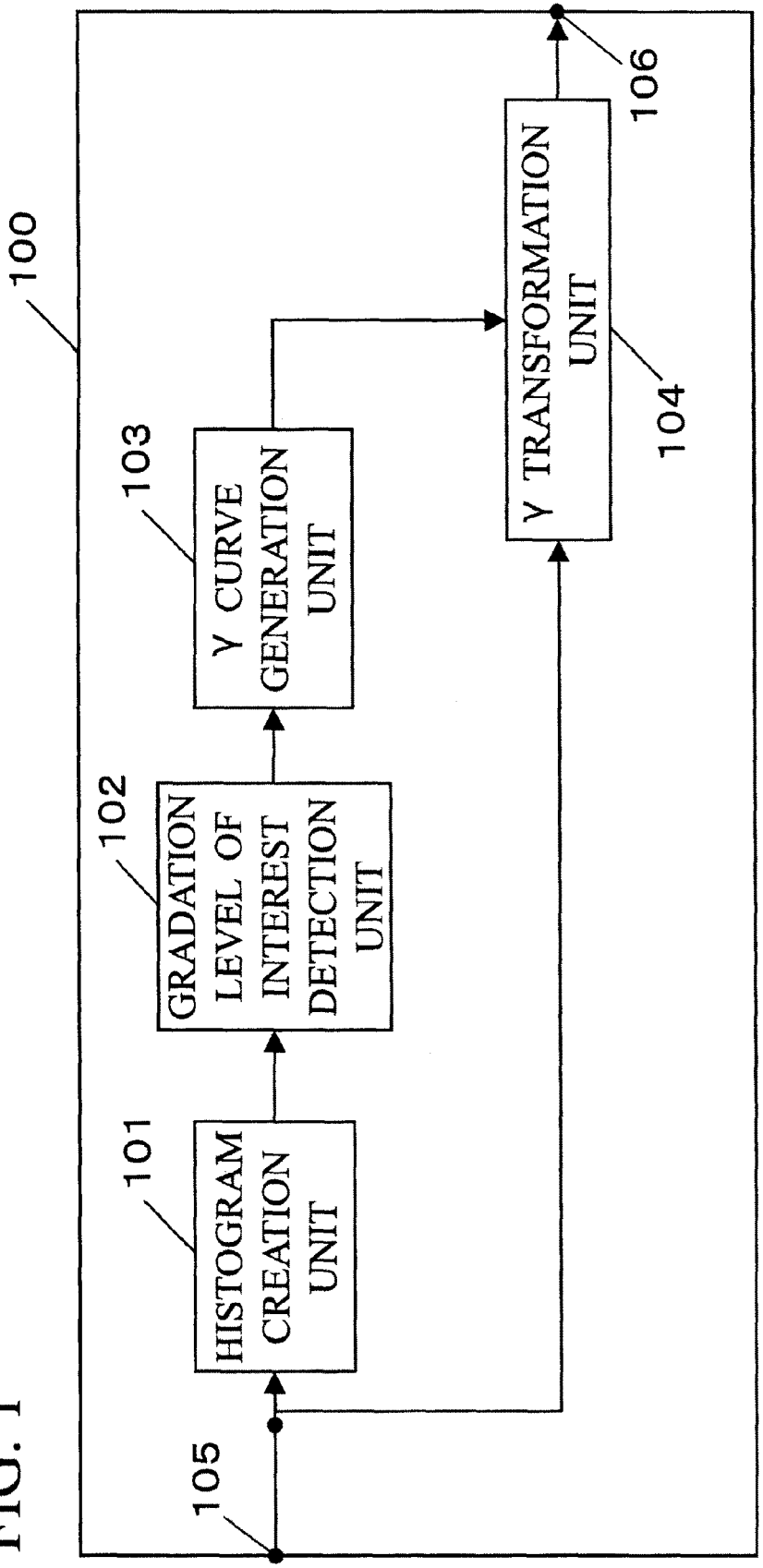
FIG. 1 is a block diagram depicting a functional configuration of an image processing apparatus according to Example 1.

FIG. 1 is a block diagram depicting a functional configuration of an image processing apparatus according to the present example. As FIG. 1 shows, the image processing apparatus 100 according to the present example has a histogram creation unit 101, a gradation level of interest detection unit 102, a γ curve generation unit 103, a γ transformation unit 104, an input terminal 105 and an output terminal 106.

Figure 2:
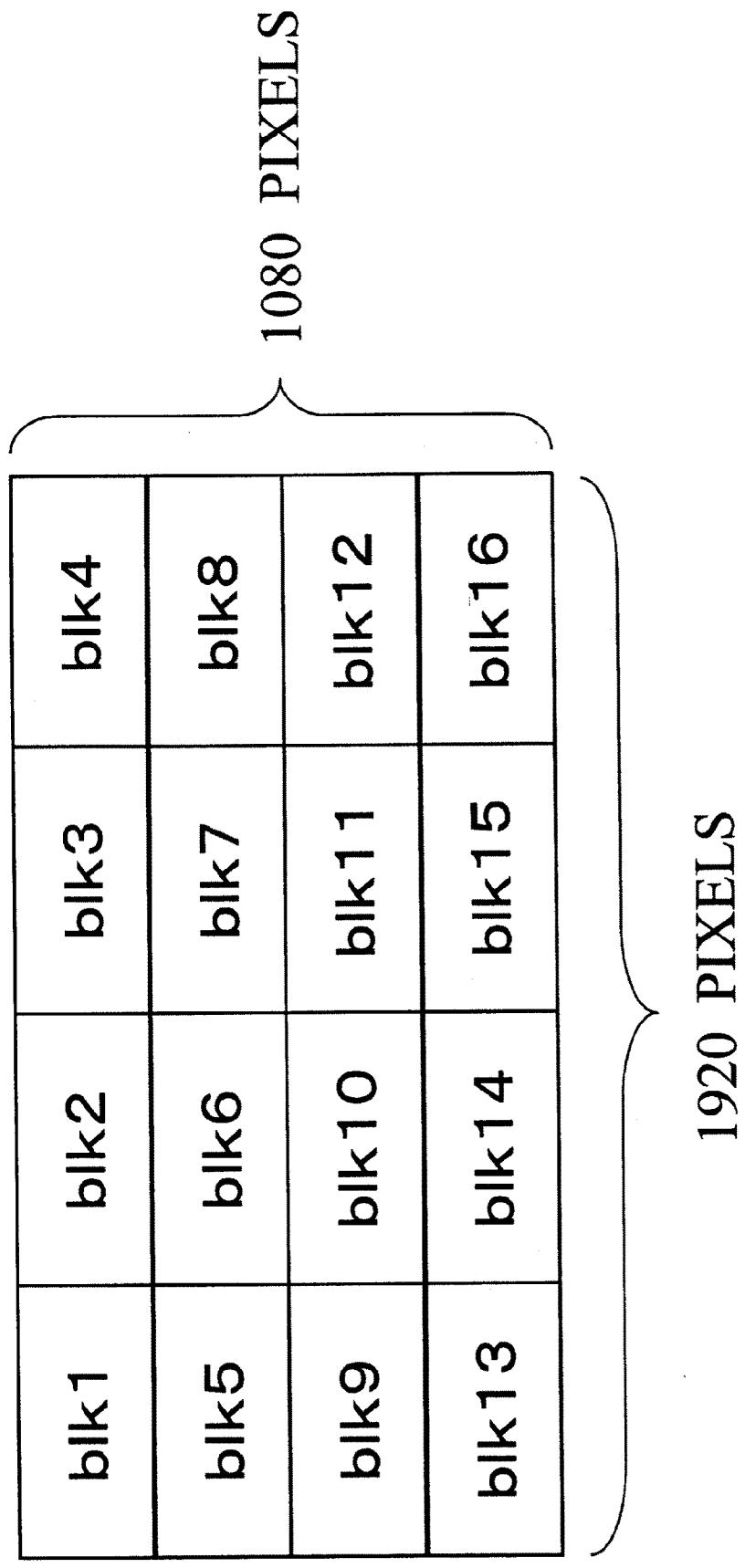
FIG. 2 shows an example of an input image and divided areas.

The histogram creation unit 101 generates a brightness histogram from an input image (input image signals). In the present example, the histogram creation unit 101 divides the input image into a plurality of areas, and creates a brightness histogram for each area. In concrete terms, a 1920×1080 image is input, and this image is divided into 4×4 areas (16 areas having a same size), as shown in FIG. 2. Also, as shown in FIG. 2, the histogram creation unit 101 can identify each area by identification information (e.g. numbers, blk1 to blk16 in FIG. 2).

According to the present example, the gradation is classified into 256 categories, specifically gradation levels 0 to 255, in the brightness histogram to be created. The number of categories is not limited to this, but may be 128 or 512, for example. Although the example in FIG. 2 shows the case of dividing the input image into 16 areas, the number of areas is not limited to this. For example, the input image may be divided into 10×5 or 5×3 areas, or may not be divided at all.

The gradation level of interest detection unit 102 detects a gradation level of interest from the brightness histogram created by the histogram creation unit 101 (detection units). In concrete terms, the gradation level of interest detection unit 102 detects a gradation level of interest from the brightness histogram for each area respectively. A gradation level of interest refers to a gradation level whose gradation characteristic should be improved, and refers to a gradation level which satisfies the following conditions in the brightness histogram.
Condition 1: Frequency equal to or more than a predetermined threshold.
Condition 2: Frequency is a peak value (local maximum value).
Condition 3: Variation width of the frequencies (local change amount of frequency) in a predetermined range including the gradation level (a target to be determined as to whether the gradation level is the gradation level of interest or not) is smaller than a predetermined width.

Condition 1 is a condition to remove a gradation level whose frequency is extremely low as a noise.

In the case of a gradation level with which gradation characteristic should be improved, the frequency appears as a peak in the brightness histogram. Condition 2 is a condition to detect such a gradation level. Whether the frequency is a peak value or not can be determined, for example, by comparing the frequency of the gradation level to determine whether the gradation level is the gradation level of interest or not, and the frequencies of m number of gradation levels (m is an integer of 1 or greater) at lower and higher sides of this gradation level. m number of gradation levels at lower and higher sides of the gradation level as the target indicates m number of gradation levels smaller than the gradation level as the target, and m number of gradation levels greater than the gradation level as the target.

When the image includes an area (e.g. letterbox, graphics and characters of data broadcast) whose image has a single color (single gradation level), the frequency of a gradation level in such an area becomes much higher than the frequencies of the gradation levels at lower and higher sides of this gradation level. In other words, the variation width of the frequencies in a predetermined range including this gradation level increases (the change of the frequencies from the gradation levels at a lower side of the target to the target or the change of frequencies from gradation levels at higher side of the target to the target become sharp). Such an area (a gradation level of such an area), whose gradation characteristic need not be improved, must be removed. Condition 3 is a condition to remove such an area (that is, the predetermined width is a reference for removing areas having a single color). Whether Condition 3 is satisfied or not can be determined, for example, by comparing the frequency of the gradation level, which is the target for which it is to be determined whether the gradation level is the gradation level of interest, and a value obtained by multiplying a total of frequencies of n number of gradation levels (n is an integer of 1 or greater) at lower and higher sides of the gradation level respectively, excluding the gradation level, by a predetermined value.

For example, if the gradation level which is the target for which it is to be determined whether the gradation level is a gradation level of interest or not is i, the frequency of the gradation level i is h (i), a predetermined threshold is th, m is ra1, n is ra2, and a predetermined value is k, then Conditions 1 to 3 can be given by the following Expressions 1 to 3.

$$h(i) \geq th \quad \text{[Expression 1]}$$

$$h(i) = \max_{i-ra1 < j < i+ra1} h(j) \quad \text{[Expression 2]}$$

$$h(i) < k \times \left( \sum_{1=i-ra2}^{i+ra2} h(1) - h(i) \right) \quad \text{[Expression 3]}$$

The threshold th is, for example, a value of 1% of the total frequency of one brightness histogram (that is, the total number of pixels in one area). In the present example, a 1920× 1080 image is divided into 16 areas having a same size, so the threshold th is set to 1296 ((1920×1080/16)×0.01=1296). The threshold th is not limited to 1% of the total frequency, but can be any value if a gradation level, with which a gradation characteristic should be improved, can be detected (e.g. 3% or 5% of total frequency).

According to the present example, ra1 in Expression 2 is "2". In other words, the frequency h(i) is compared with the respective frequencies of two gradation levels at lower and higher sides of the gradation level of this frequency, that is, h(i−2), h(i−1), h(i+1) and h(i+2), and it is regarded that the gradation level i satisfies Condition 2 when the frequency h(i) is the highest (this frequency h(i) is regarded as the peak value). ra1 is not limited to 2, but can be any value if it can be used for determining whether the frequency h(i) is the peak value or not (e.g. 3 or 5).

According to the present example, ra2 is 2 and k is 1.2 in Expression 3. In other words, it is regarded that the gradation level i satisfies Condition 3 if the frequency h(i) is lower than 1.2 times of the total of frequencies of the respective two gradation levels at lower and higher sides of the gradation level i, without including the gradation level i (=1.2×(h(i−2)+h (i−1)+h(i+1)+h(i+2))) (It is regarded that the variation width of frequencies in a predetermined range that includes the gradation level is smaller than a predetermined width.). ra2 and k are not limited to these values, but can be any values only if the gradation level in areas having a single color can be removed (e.g. ra2=3 or 5, k=1.5 or 2). According to the present example, the frequency h (i) is compared with a value obtained by multiplying the total of the frequencies of the respective n number of gradation levels at lower and higher sides of the gradation level i, without including the gradation level i, by a predetermined value k, but the frequency h(i) may be compared with a value obtained by multiplying a total of the frequencies of the respective n number of gradation levels at lower and higher sides of the gradation level i, including the gradation level i, by a predetermined value k. Any type of determination can be used only if the gradation level in areas having a single color can be removed.

According to the present example, the gradation level of interest detection unit 102 detects a gradation level of interest in a dark portion (dark portion gradation level of interest) and a gradation level of interest in a light portion (light portion gradation level of interest) after dividing the gradations into a dark portion and a light portion. In concrete terms, the gradation levels 2 to 126 are defined as a dark portion. A gradation level that satisfies Conditions 1 to 3 is searched for from the lower gradation level side of the dark portion, and the gradation level satisfying Conditions 1 to 3, which is detected first, is defined as the dark portion gradation levels of interest. In other words, if there are a plurality of gradation levels that satisfy Conditions 1 to 3, then the gradation level in a lowest gradation level side is detected as the dark portion gradation level of interest. If there is no gradation level satisfying Conditions 1 to 3 in the gradation levels 2 to 126, then the gradation level of interest detection unit 102 detects the gradation level 128 as the dark portion gradation level of interest. According to the present example, gradation levels 0 and 1 are excluded from the searching range, since the frequencies of the respective two gradation levels at lower and higher sides of the processing target gradation level are used for detecting the gradation level of interest.

The gradation levels 130 to 253 are defined as a light portion. A gradation level that satisfies Conditions 1 to 3 is searched for from the higher gradation level side of the light portion, and the gradation level satisfying Conditions 1 to 3, which is detected first, is defined as the light portion gradation level of interest. In other words, if there are a plurality of gradation levels that satisfy Conditions 1 to 3, then the gradation level in a highest gradation level side is detected as the light portion gradation level of interest. If there is no gradation level satisfying Conditions 1 to 3 in the gradation levels 130 to 253, then the gradation level of interest detection unit 102 detects the gradation level 128 as the light portion gradation level of interest. According to the present example, the gradation levels 254 and 255 are excluded from the searching range, since frequencies of the respective two gradation levels at lower and higher sides of the processing target gradation level are used for detecting the gradation level of interest.

Figure 3:
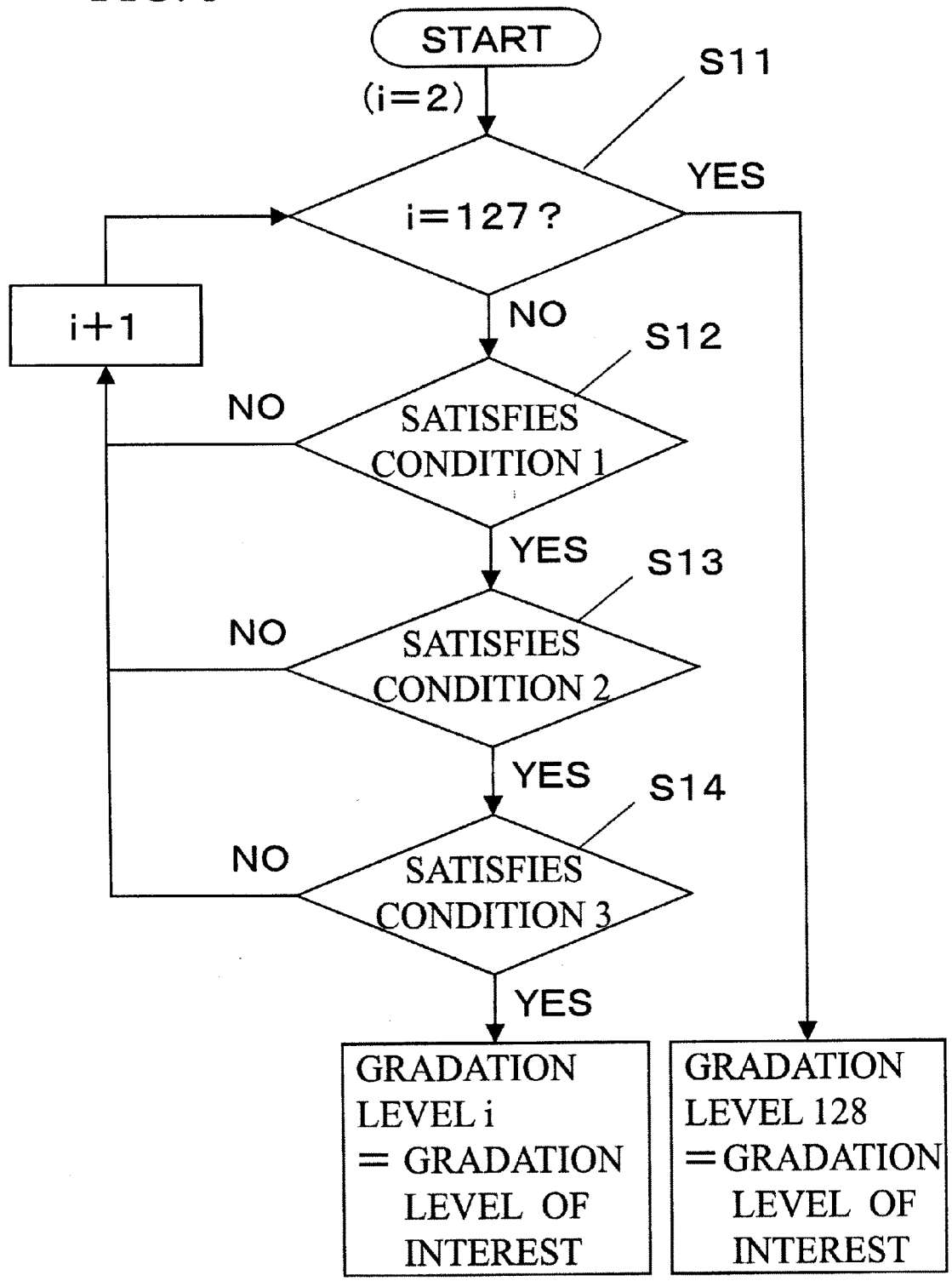
FIG. 3 is a flow chart depicting an example of a processing flow to detect a dark portion gradation level of interest.
Figure 4:
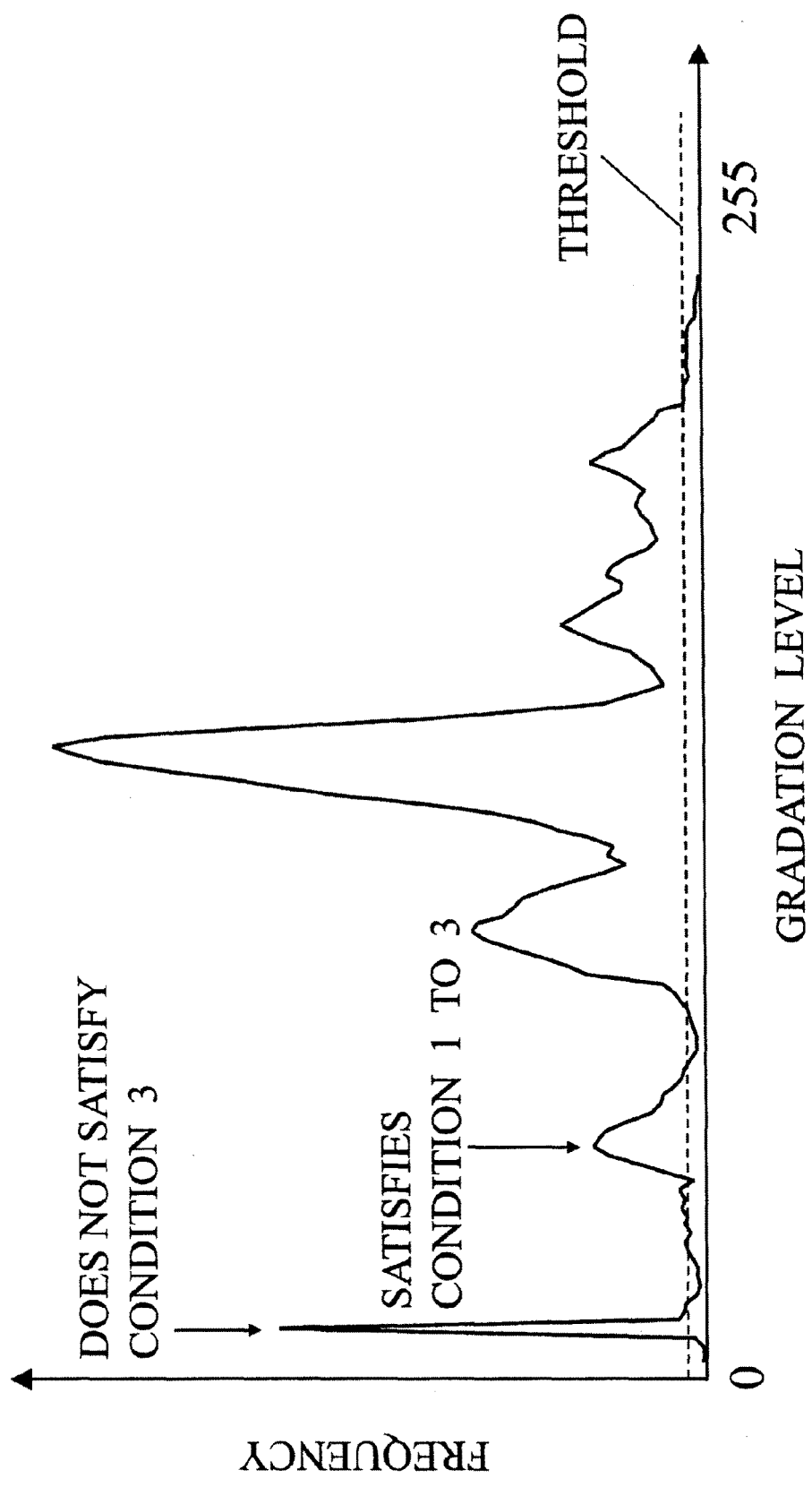
FIG. 4 is a diagram depicting an example of a brightness histogram.

A processing flow to detect a dark portion gradation level of interest will now be described with reference to FIG. 3 to FIG. 5. FIG. 3 is a flow chart depicting an example of the processing flow to detect a dark portion gradation level of interest. FIG. 4 is a diagram showing an example of a brightness histogram. A case of detecting a gradation level of interest from the brightness histogram in FIG. 4 will be described herein below. FIG. 5 shows a table that indicates each gradation level and frequency thereof in the brightness histogram in FIG. 4. As mentioned above, according to the present example, a processing target gradation level i is selected sequentially from the lower gradation level side (gradation level 2) when a dark portion gradation level of interest is detected. The gradation levels 2 to 13, which are omitted in FIG. 5, are regarded as not satisfying Conditions 1 to 3, and processing for gradation level 14 and later will be described in detail herein below.

First in step S11, the gradation level of interest detection unit 102 determines whether the gradation level is the gradation level 127 or not. If the gradation level is the gradation level 127 (step S11: YES), the gradation level of interest detection unit 102 detects the gradation level 128 as the gradation level of interest, and ends processing. The gradation level 14, however, is not the gradation level 127 (step S11: NO), so the processing advances to step S12. In step S12, the gradation level of interest detection unit 102 determines whether the gradation level i satisfies Condition 1 (Expression 1). The frequency of the gradation level 14 is 500 (<1296), that is, the gradation level 14 does not satisfy Condition 1 (step S12: NO), so processing returns to step S11. When processing returns to step S11, the gradation level of interest detection unit 102 adds 1 to i. In other words, the gradation level 15 becomes the processing target gradation level after the gradation level 14.

In step S11, it is determined that the gradation level 15 is not the gradation level 127, so processing advances to step S12. In step S12, the frequency of the gradation level 15 is 2500, that is, the gradation level 15 satisfies Condition 1 (step S12: YES), and processing advances to step S13. In step S13, the gradation level of interest detection unit 102 determines whether the gradation level satisfies Condition 2 (Expression 2). The frequency 2500 of the gradation level 15 is smaller than the frequency 12000 of the gradation level 16, that is, the gradation level 15 does not satisfy Condition 2 (step S13: NO), so the gradation level of interest detection unit 102 adds 1 to i, and processing returns to step S11.

In step S11, it is determined that the gradation level 16 is not the gradation level 127, so processing advances to step S12. Since the gradation level 16 satisfies Conditions 1 and 2 (step S12, 13: YES), processing advances to step S14. In step S14, the gradation level of interest detection unit 102 determines whether the gradation level satisfies Condition 3 (Expression 3). The total of the frequencies of the gradation levels 14, 15, 17 and 18 is 6000, and a value obtained by multiplying this value by 1.2 is 7200. The frequency of the gradation level 16 is higher than 7200, that is, the gradation level 16 does not satisfy Condition 3 (step S14: NO), so the gradation level of interest detection unit 102 adds 1 to i, and processing returns to step S11.

In this way, a gradation level that satisfies Conditions 1 to 3 (frequency thereof satisfies Expressions 1 to 3) is searched for. In the case of the brightness histogram shown in FIG. 4 and FIG. 5, the gradation level 32 is detected first as a gradation level that satisfies Conditions 1 to 3. Therefore the gradation level 32 is defined as a dark portion gradation level of interest.

Figure 6:
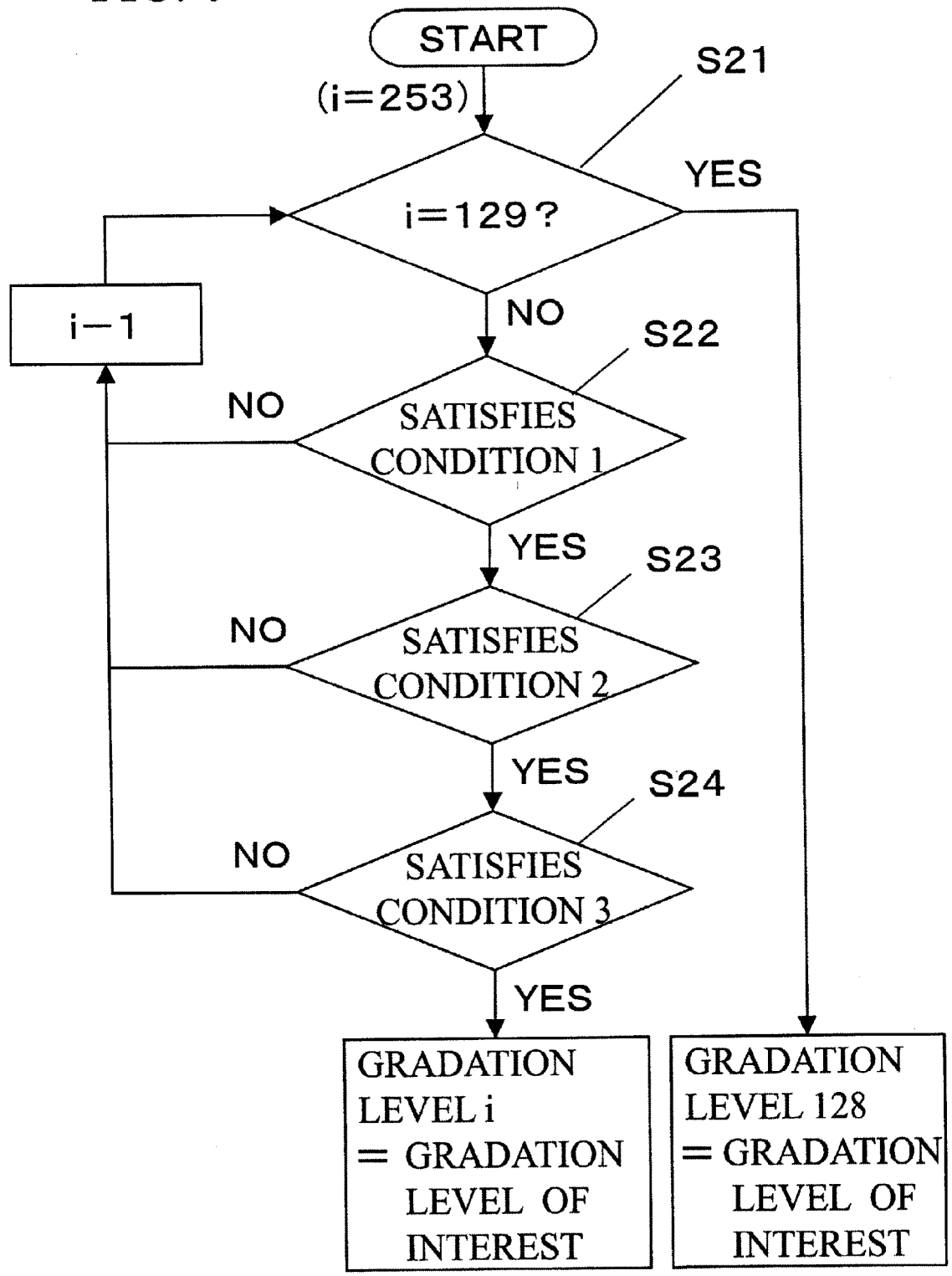
FIG. 6 is a flow chart depicting an example of a processing flow to detect a light portion gradation level of interest.

A processing flow to detect a light portion gradation level of interest will be described next with reference to FIG. 6. FIG. 6 is a flow chart depicting an example of the processing flow to detect a light portion gradation level of interest. As mentioned above, according to the present example, a processing target gradation level i is selected sequentially from the higher gradation level side (gradation level 253) when a light portion gradation level of interest is detected.

First the gradation level of interest detection unit 102 determines whether the gradation level i is the gradation level 129 or not (step S21). If the gradation level i is the gradation level 129 (step S21: YES), the gradation level of interest detection unit 102 detects the gradation level 128 as the gradation level of interest, and ends processing. If the processing target gradation level i is not the gradation level 129, processing advances to step S22. A description of the processings in steps S22 to S24 is omitted, since they are the same as the processing in steps S12 to S14 in FIG. 3, respectively. If the gradation level i does not satisfy at least one of Conditions 1 to 3, the gradation level of interest detection unit 102 subtracts 1 from i, and processing returns to step S21.

By the above mentioned method, the dark portion gradation level of interest and the light portion gradation level of interest in each area are detected.

In the present example, it is assumed that the dark portion gradation level of interest in each area is detected as shown in FIG. 7A, and the light portion gradation level of interest is detected as shown in FIG. 7B.

The γ curve generation unit 103 generates a gradation correction parameter (γ curve) for improving the gradation characteristic in the gradation range around the gradation level of interest (gradation correction parameter generation unit). According to the present embodiment, one γ curve is generated for an input image. In concrete terms, a γ curve for improving the gradation characteristic in a gradation range around the gradation level in the lowest gradation level side, out of a plurality of dark portion gradation levels of interest detected for each area, and in a gradation range around the gradation level in the highest gradation level side, out of a plurality of light portion gradation levels of interest detected for each area, is generated. As a result, the generation of underexposure and overexposure can be controlled.

Figure 8:
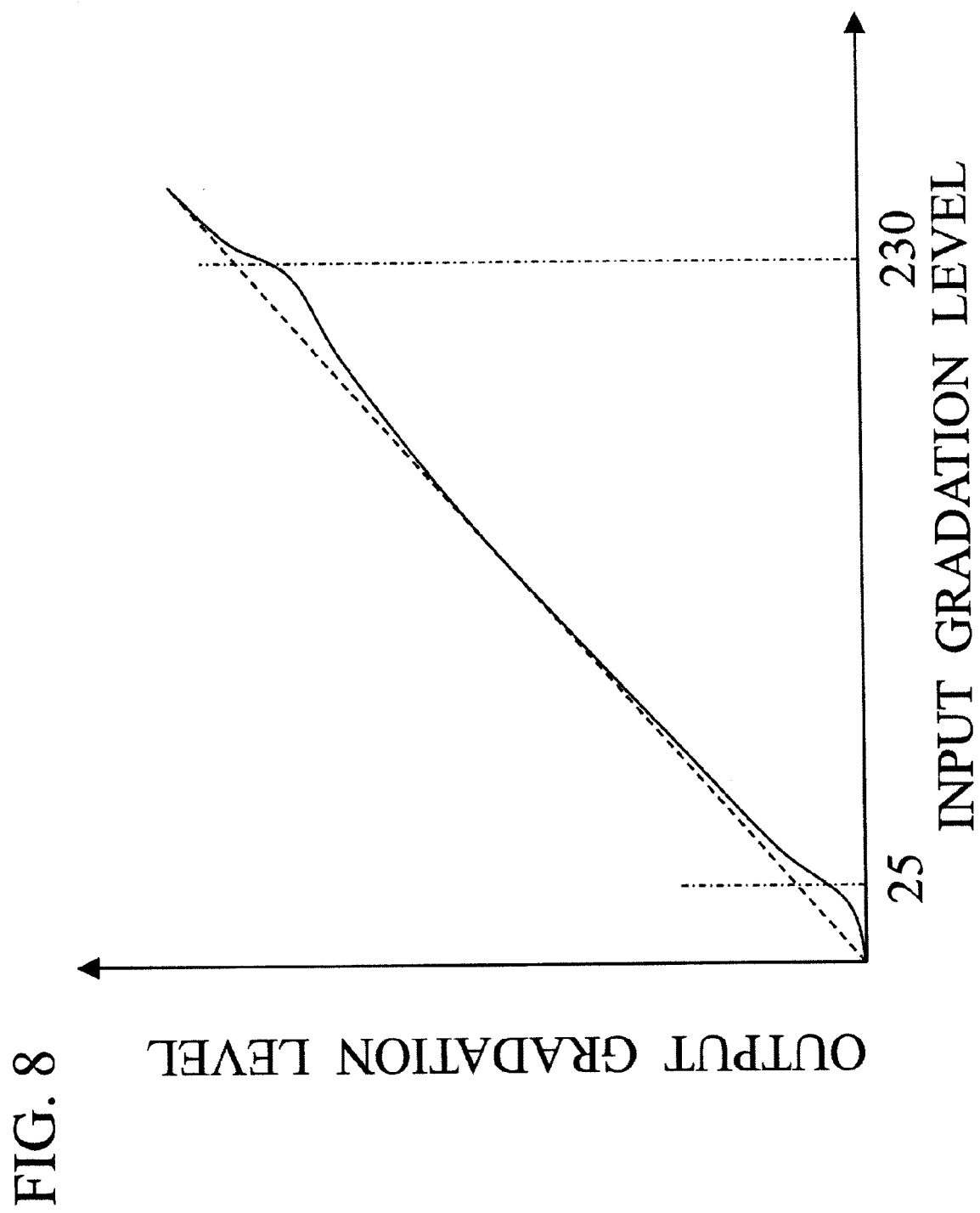
FIG. 8 is a graph depicting an example of a γ curve generated in Example 1.

According to the present example, the dark portion gradation level of interest in the lowest gradation level side (minimum value of the dark portion gradation level of interest) is a gradation level 25 in the area blk6, as shown in FIG. 7A. The light portion gradation level of interest in the highest gradation level side (maximum value of light portion gradation level of interest) is the gradation level 230 in the area blk2, as shown in FIG. 7B. Therefore as shown in FIG. 8, a γ curve, for improving the gradation characteristic in the gradation range around the gradation level 25 for the dark portion and for improving the gradation characteristic in the gradation range around the gradation level 230 for the light portion, is generated (the solid line in FIG. 8). The broken line in FIG. 8 is a γ curve (transformation line) for outputting the input image as is. Here an example of setting the γ curve around the intermediate gradation level 127 to a linear γ curve is shown. The γ curve around the intermediate gradation level 127 may be a γ curve depending on the frequency around the intermediate gradation level 127, instead of a linear γ curve. For example, in the case when the frequency around the intermediate gradation level 127 is high (a case when the frequency is higher than a predetermined threshold and also is a peak value), as shown in FIG. 4, a γ curve for improving the gradation characteristic in the gradation range around the intermediate gradation level 127 may be used.

The γ transformation unit 104 corrects the gradation of an input image using a gradation correction parameter (correction unit), and outputs the corrected signal (image signal) to a display apparatus (not illustrated). The display apparatus is, for example, a display having a plurality of electron emitting devices, a plasma display, a liquid crystal display and an organic EL display. In the example of the configuration in FIG. 1, the image processing apparatus 100 and the display apparatus are separated, but the image processing apparatus 100 and the display apparatus may be integrated.

As described above, according to the present example, even if the frequency of a gradation level whose the gradation characteristic should be improved (gradation level that satisfies Conditions 1 to 3) is lower than the frequencies of the other gradation levels, a gradation correction parameter for improving the gradation characteristic in a gradation range around this gradation level can be generated. A gradation level in areas having a single color, which does not satisfy Condition 3, is removed from the gradation levels of interest. As a result, an image which is input with good contrast can be displayed.

According to the present example, subtle contrast (e.g. contrast of shadows) in a dark portion and light portion can be expressed well by generating the gradation correction parameters for improving the gradation characteristic in a gradation range around the dark portion gradation level of interest and a gradation range around the light portion gradation level of interest. Also according to the present example, an input image is divided into a plurality of areas, and a gradation level of interest is detected for each area, so even if an area in which the contrast must be expressed is apart of an image, the contrast of this portion can be expressed well.

According to the present example, gradation correction parameters for improving the gradation characteristic in the gradation range around the gradation level of interest in the lowest gradation level side and in the gradation range around the gradation level of interest in the highest gradation level side, out of the plurality of gradation levels of interest detected for each area, are generated. However, a gradation correction parameter generation method is not limited to this. The generation of underexposure can be controlled by generating a gradation correction parameter for improving the gradation characteristic in the gradation range at least around the gradation level of interest in the lowest gradation level side, out of the plurality of gradation levels of interest detected for each area. Also, the generation of overexposure can be controlled by generating a gradation correction parameter for improving the gradation characteristic in the gradation range at least around the gradation level of interest in the highest gradation level side, out of the plurality of gradation levels of interest detected for each area. If an input image is not divided into a plurality of areas, at least a gradation level in the lowest gradation level side, or a gradation level in the highest gradation level side, out of a plurality of gradation levels that satisfy Conditions 1 to 3, in the brightness histogram of the input image, can be detected as a gradation level of interest. As a result, the generation of underexposure and overexposure can be controlled. The gradation level of interest is not limited to a gradation level in the lowest gradation level side or a gradation level in the highest gradation level side, but may be a gradation level that can satisfy Conditions 1 to 3, then the gradation characteristic in a gradation range around the gradation level whose gradation characteristic could not be improved conventionally (gradation level with which the gradation characteristic should be improved) can be improved.

According to the present example, a case of the histogram creation unit 101 generating the brightness histogram was described, but the present invention is not limited to this. For example, a histogram can be used whose x axis is not a gradation level of the brightness values, but is a gradation level of a mean value of the R (red) pixel value, G (green) pixel value and B (blue) pixel value, or a histogram of which x axis is a gradation level of the maximum value of the R (red) pixel value, G (green) pixel value and B (blue) pixel value. A histogram can also be used whose x axis is a gradation level of a pixel value of one of R (red) pixel value, G (green) pixel value and B (blue) pixel value, such as a histogram of which x axis is a gradation level of G (green) pixel value. The present example can be applied to any of these histograms, which can express the characteristics of an image.

Example 2

Example 2 of the image processing apparatus and a control method thereof according to an embodiment of the present invention will now be described.

Figure 9:
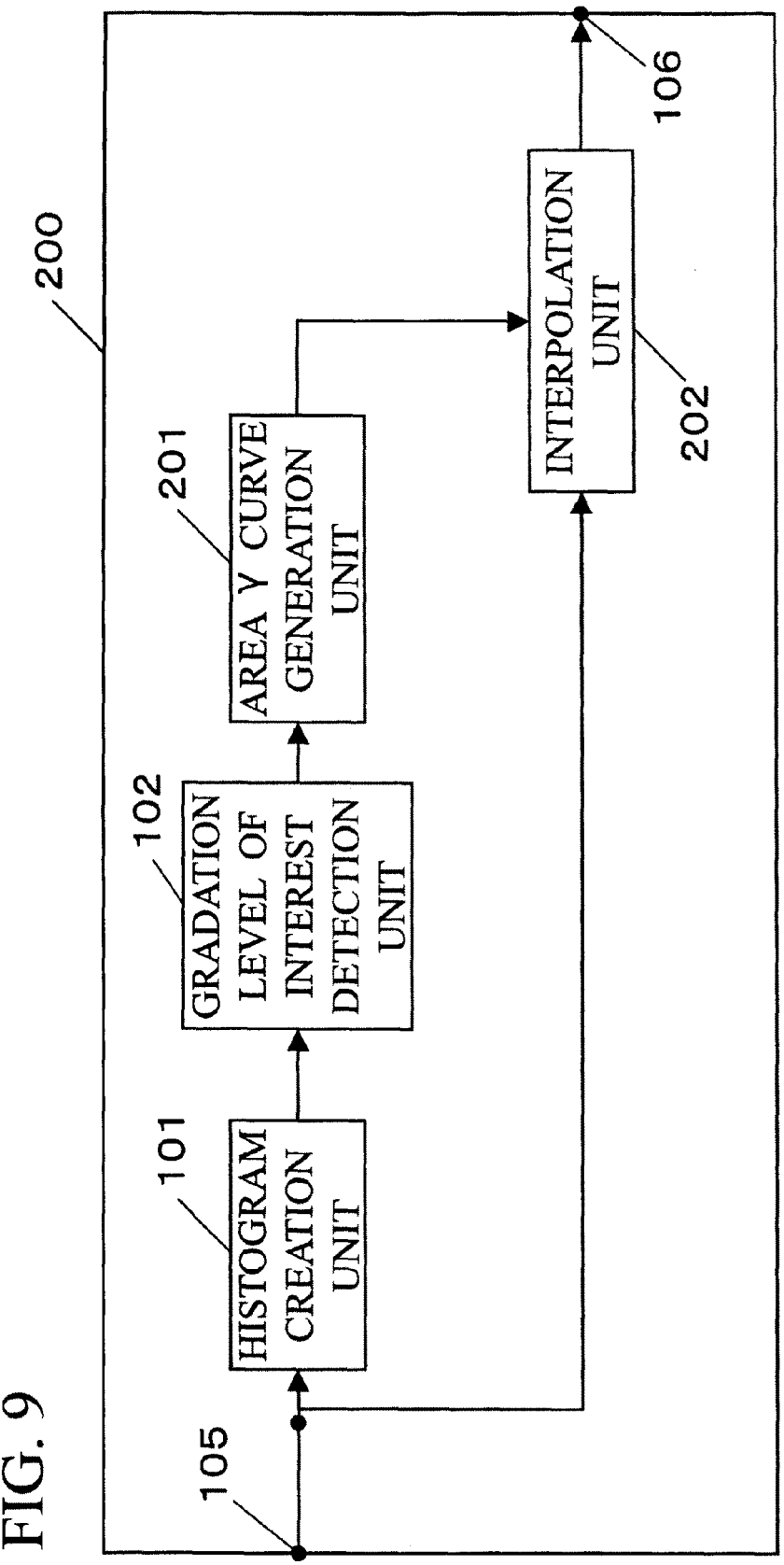
FIG. 9 is a block diagram depicting a functional configuration of an image processing apparatus according to Example 2.

FIG. 9 is a block diagram depicting a functional configuration of an image processing apparatus according to the present example. As FIG. 9 shows, the image processing apparatus 200 according to the present example has: a histogram creation unit 101, a gradation level of interest detection unit 102, an area γ curve generation unit 201, an interpolation unit 202, an input terminal 105 and an output terminal 106. A function, the same as that of Example 1, is denoted with a same reference symbol, and the description thereof is omitted.

The area γ curve generation unit 201 generates a gradation correction parameter for each area to improve the gradation characteristic in a gradation range around the gradation level of interest in this area (gradation correction parameter generation unit). For example, as FIG. 7A and FIG. 7B show, in the area blk1, the gradation level 100 is detected as the dark portion gradation level of interest, and gradation level 128 is detected as the light portion gradation level of interest. Therefore, for the area blk1, a γ curve for improving the gradation characteristic in the gradation range around the gradation level 100 and the gradation range around the gradation level 128 is generated. In the same manner, a γ curve is generated for the areas blk2 to blk16 respectively (in other words, a total of 16 γ curves are generated).

The interpolation unit 202 combines a first brightness value and a second brightness value for each pixel of the input image, and defines this combined brightness value as a final brightness value of the pixel, whereby the gradation of the input image is corrected. The first brightness value is a brightness value calculated using a gradation correction parameter that is generated for an area to which the processing target pixel belongs (first area). The second brightness value is a brightness value calculated using a gradation correction parameter generated for an area adjacent to the first area (second area). The interpolation unit 202 combines the first brightness value and the second brightness value using weights based on the positional relationship between the pixel and the first area and the potential relationship between the pixel and the second area. If the brightness value of a processing target pixel is corrected using the gradation correction parameter generated for the area to which this pixel belongs, that is, if the brightness value is corrected using a γ curve that is different for each area, then a boundary line may be generated between two adjacent areas because of the discontinuity of the brightness values. According to the present example, the generation of such a boundary line can be controlled by correcting the brightness value using the above mentioned method.

There may be one second area or a plurality of second areas. According to the present example, all the adjacent areas to the first area are defined as second areas. In other words, if the area blk1 is the first area, then the areas blk2, blk5 and blk6 are defined as the second areas. If the area blk6 is the first area, then the areas blk1, blk2, blk3, blk5, blk7, blk9, blk10 and blk11 are defined as the second areas.

An example will now be described with reference to FIG. 10.

Figure 10:
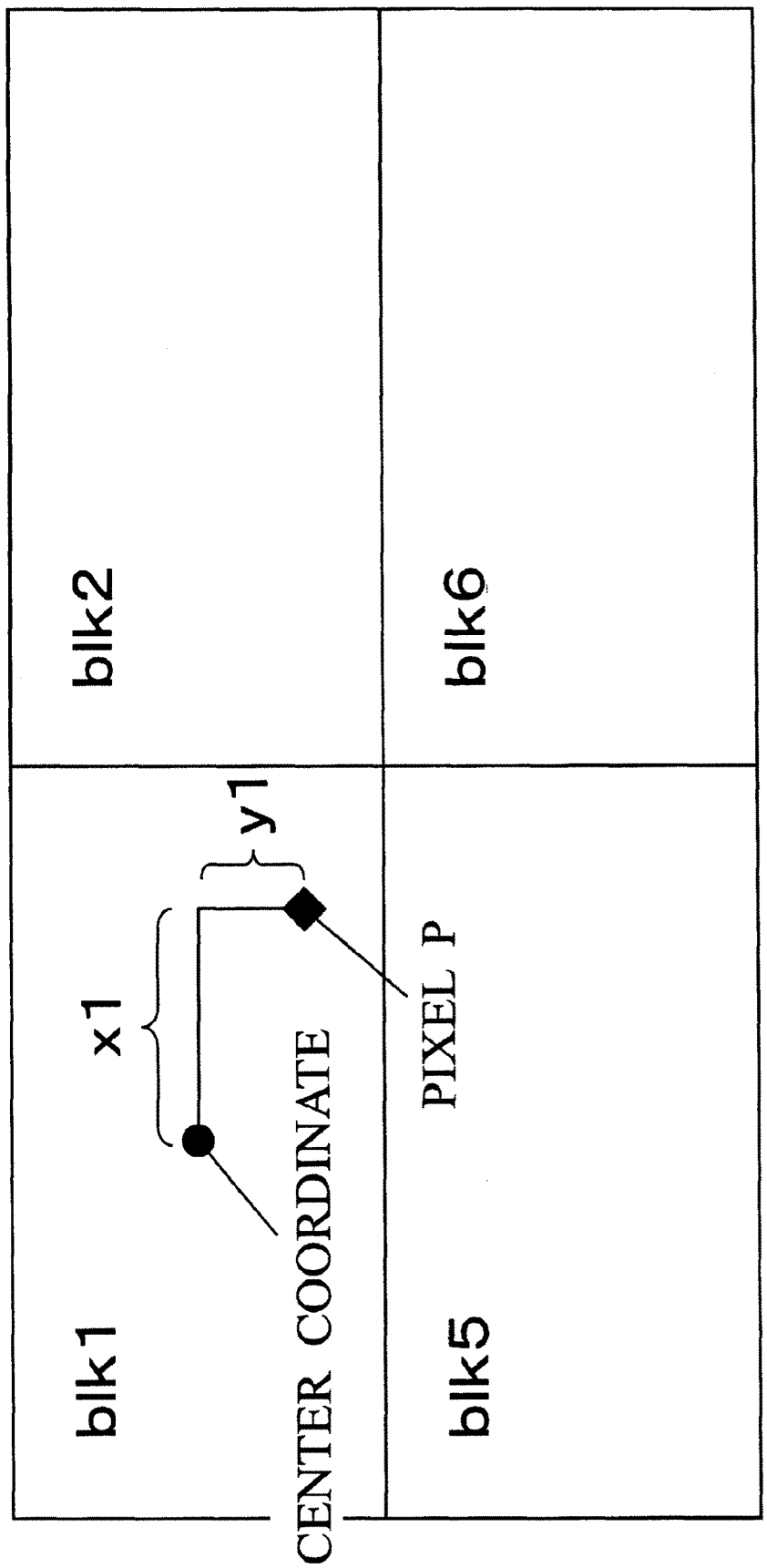
FIG. 10 is a diagram depicting a correction method for a brightness value in Example 2.

A brightness value of pixel P, which belongs to area blk1 as shown in FIG. 10, is corrected using four γ curves which correspond to the area blk1 and the peripheral areas thereof blk2, blk5 and blk6 respectively. In concrete terms, brightness values obtained by these γ curves are weighted using the distance x in the horizontal direction and the distance y in the vertical direction from the central coordinate of the area blk1 to the position of the pixel P, and combined. It is assumed that the combining ratio when the distance x=x1 is 0.7, and the combining ratio when the distance y=y1 is 0.6. It is assumed that the γ curves generated for the areas blk1, blk2, blk5 and blk6, using the distance from the central coordinate of each area to the position of pixel P, are γ1, γ2, γ5 and γ6 respectively. And if it is assumed that the brightness values after correcting the brightness value of pixel P using these γ curves are OP1, OP2, OP5 and OP6 respectively, then the final brightness value OP of pixel P is given by Expression 4.

$$OP=0.6 \times (0.7 \times OP1+(1-0.7) \times OP2)+(1-0.6) \times (0.7 \times OP5+(1-0.7) \times OP6)$$ [Expression 4]

The above mentioned combining ratios are obtained from a table or mathematical expression.

As mentioned above, according to the present example, the gradation correction depending on the characteristics of each area (dynamic γ processing) can be performed, since the gradation correction parameter is generated for each area. In other words, good contrast can be expressed by improving the gradation characteristic in a dark portion for an area having a gradation level of interest in a dark portion, and declining to improve the gradation characteristic in a dark portion for an area not having a gradation level of interest in a dark portion. Good contrast can also be expressed by improving the gradation characteristic of a light portion for an area having a gradation level of interest in a light portion, and declining to improve the gradation characteristic in a light portion for an area not having a gradation level of interest in a light portion. According to the present example, a final brightness value is obtained by combining the above-mentioned first brightness value and the second brightness value, that is, a brightness value considering the gradation correction parameters of adjacent areas is obtained, and therefore, generation of a boundary line between two adjacent areas can be controlled.

In the present example, all the areas adjacent to the first area are defined as the second areas, but a second area selection method is not limited to this. Four areas adjacent to the top, bottom, left and right of the first area may be defined as the second areas. By this as well, the above-mentioned effect can be implemented. Also, one of the areas adjacent to the top, bottom, left and right of the first area may be defined as the second area. If at least one area adjacent to the top, bottom, left or right of the first area is defined as the second area, then generation of a boundary line between two areas adjacent to the first area in one direction can be controlled.

Further, if a gradation correction parameter in an area close to a processing target pixel, out of the areas adjacent to the first area, is considered, the generation of the boundary line can be controlled. For example, the second area may be selected depending on the position of the processing target pixel in the first area. In concrete terms, the first area is divided into 2×2, a total of four areas, and if the processing target pixel belongs to the lower right area of these four areas, then the areas adjacent to the right, bottom and lower right of the first area may be defined as the second areas.

An example of using the brightness histogram was shown. However, the present example can be applied to any histogram that can express the characteristics of an image, such as a histogram whose x axis is a gradation level of a pixel value other than the brightness value. If a pixel value other than the brightness value is used, the interpolation unit 202 corrects this pixel value, instead of the brightness value. A pixel value refers not only to an R (red) pixel value, G (green) pixel value and B (blue) pixel value, but also to a value that expresses color and brightness of a pixel, including a mean value of an R (red) pixel value, G (green) pixel value and B (blue) pixel value, or a brightness value.

Example 3

Example 3 of the image processing apparatus and the control method thereof according to an embodiment of the present invention will now be described. In concrete terms, a method for setting a gradation correction parameter appropriate for an input image, even if the gradation level (gradation level of interest) that satisfies Conditions 1 to 3 described in Example 1 cannot be detected in the input image, will be described.

Figure 12:
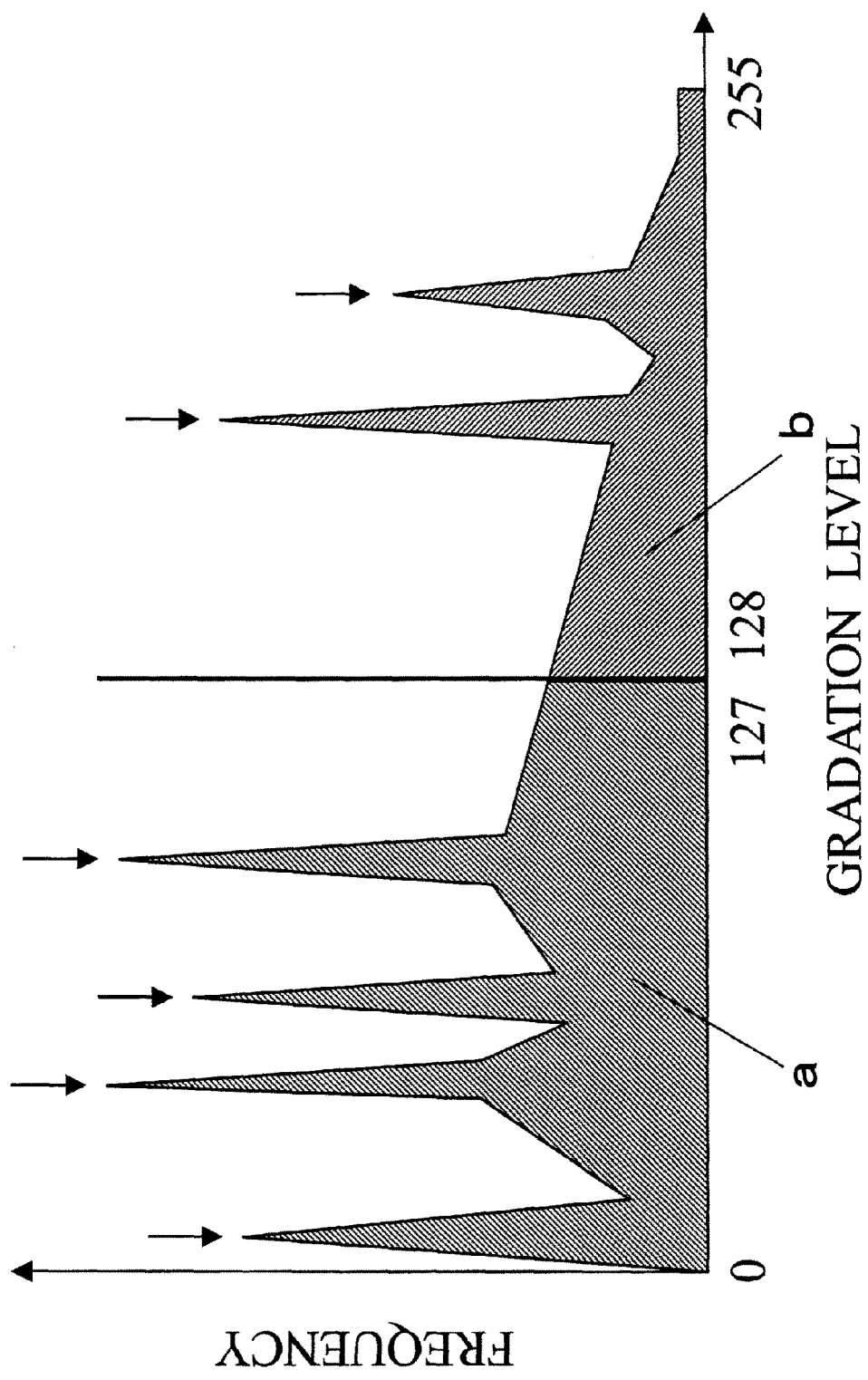
FIG. 12 is a diagram depicting an example of a brightness histogram of an image in which a gradation level of interest is not detected.

An image in which a gradation level of interest cannot be detected is described first. An example of such an image is an image constituted by a combination of areas having a single color, such as animation. In such an image, a brightness histogram as shown in FIG. 12 is obtained. In the case of this brightness histogram, frequencies radically fluctuate from gradation levels at lower and higher sides of a peak gradation level to the peak gradation level (since the image is constituted by a combination of areas having a single color) (see the arrow marks in FIG. 12). In other words, a gradation level that satisfies Condition 3 does not exist in this image, and therefore a gradation level of interest is not detected. As a result, even if the image is dark, the gradation characteristic in a dark portion cannot be improved, and an underexposure is generated. Also, even if the image is light, the gradation characteristic in the light portion cannot be improved, and an overexposure is generated.

Figure 11:
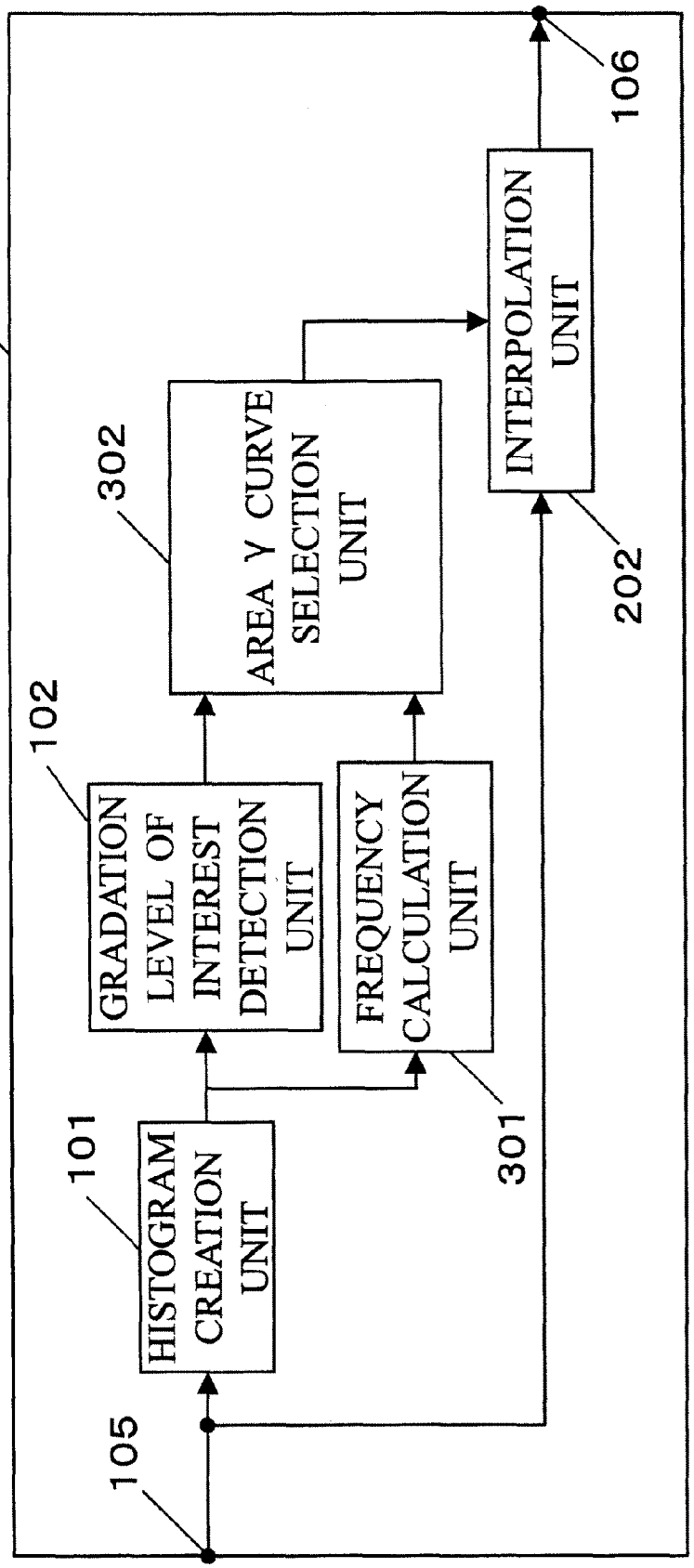
FIG. 11 is a block diagram depicting a functional configuration of an image processing apparatus according to Example 3.

FIG. 11 is a block diagram depicting a functional configuration of an image processing apparatus according to the present example. As FIG. 11 shows, the image processing apparatus 300 according to the present example has a histogram creation unit 101, a gradation level of interest detection unit 102, a frequency calculation unit 301, an area γ curve selection unit 302 and an interpolation unit 202. A function the same as that of Example 1 or Example 2 is denoted with a same reference symbol, and a description thereof is omitted.

The frequency calculation unit 301 calculates the total of frequencies from a minimum gradation level to a predetermined gradation level of the brightness histogram as the frequency in the low gradation level side (dark portion), that is, the dark portion frequency (calculation unit). The frequency calculation unit 301 also calculates the total of frequencies from a predetermined gradation level to a maximum gradation level of the brightness histogram as the frequency in the high gradation level side (light portion), that is, the light portion frequency. According to the present example, the integration value a of frequencies from the gradation level 0 to the gradation level 127 is defined as the dark portion frequency, and the integration value b of frequencies from the gradation level 128 to the gradation level 255 is defined as the light portion frequency, as shown in FIG. 12.

The area γ curve selection unit 302 has not only the function of the area γ curve generation unit 201 of Example 2, but also a function to select any of the plurality of gradation correction parameters stored in the storage unit, which is not illustrated. In concrete terms, if a gradation level of interest is not detected by the gradation level of interest detection unit 102, the area γ curve selection unit 302 selects any of the plurality of stored gradation correction parameters depending on the dark portion frequency and the light portion frequency. According to the present example, a gradation correction parameter is determined for each area, just like Example 2.

If a gradation level of interest is not detected by the gradation level of interest detection unit 102, the interpolation unit 202 corrects the gradation of the input image using the selected gradation correction parameter. The gradation correction method in the present example is the same as Example 2.

Figure 14:
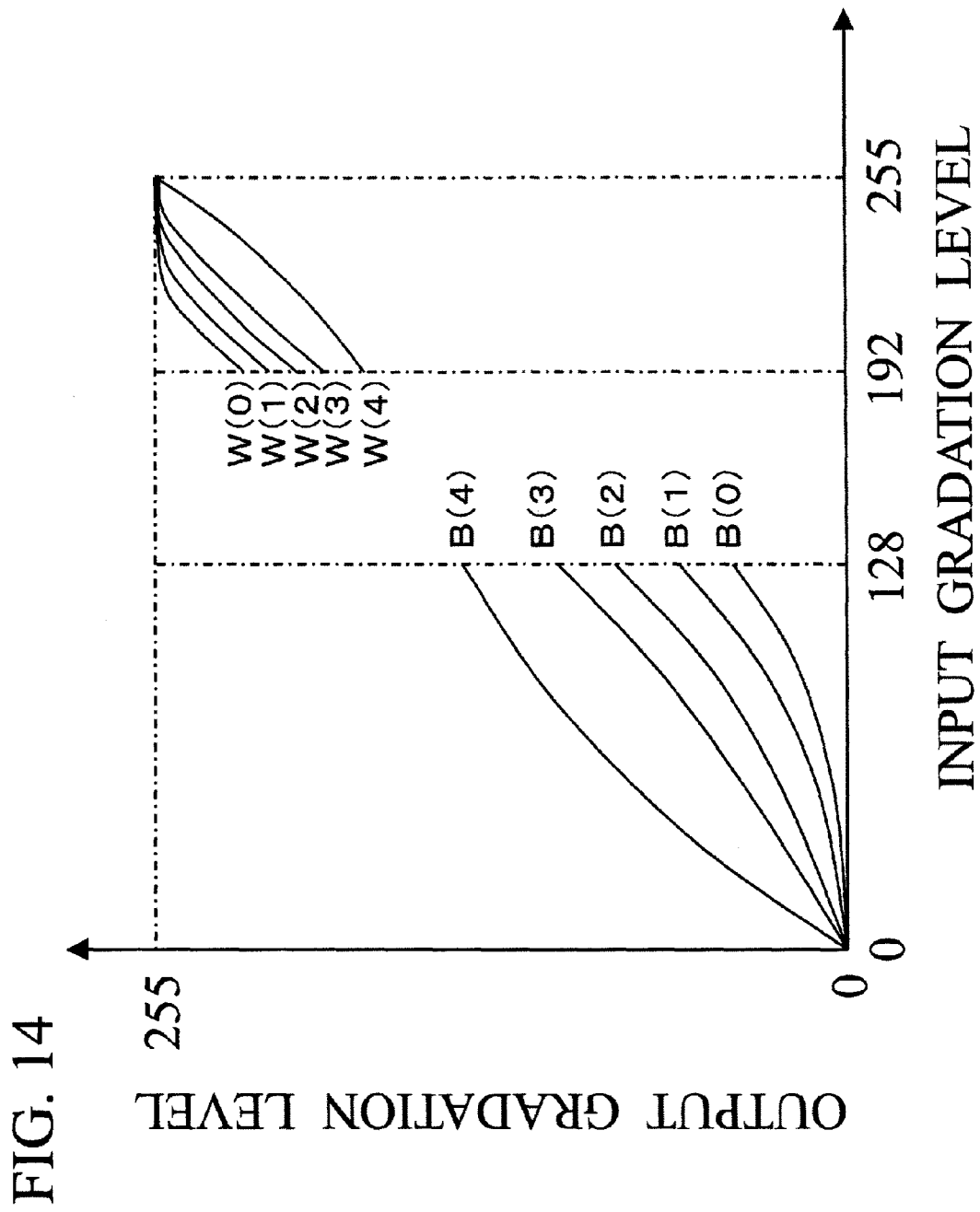
FIG. 14 is a graph depicting an example of the gradation correction parameters which are stored in advance.

The plurality of gradation correction parameters stored in the storage unit are, for example, a plurality of gradation correction parameters depending on the dark portion frequency and the light portion frequency. In the present example, it is assumed that the dark portion γ curves B (0) to B (4) in the gradation level 0 to the gradation level 128, and the light portion γ curves W (0) to W (4) in the gradation level 192 to the gradation level 255 are stored as shown in FIG. 14. In the example in FIG. 14, the dark portion γ curves B (4), B (3), B (2), B (1) and B (0) are set in order of improving the gradation characteristic in the low gradation level side. The light portion γ curves W (4), W (3), W (2), W (1) and W (0) are set in order of improving the gradation characteristic in the high gradation level side. The area γ curve selection unit 302 selects the dark portion γ curve and the light portion γ curve respectively. The γ curve from the gradation level 128 to the gradation level 191 may be generated by connecting the dark portion γ curve and the light portion γ curve by a straight line, or may be generated by connecting the dark portion γ curve and the light portion γ curve using a function with which the gradation levels 128 and 191 do not become discontinuous. As a result, one γ curve is finally generated.

Figure 13:
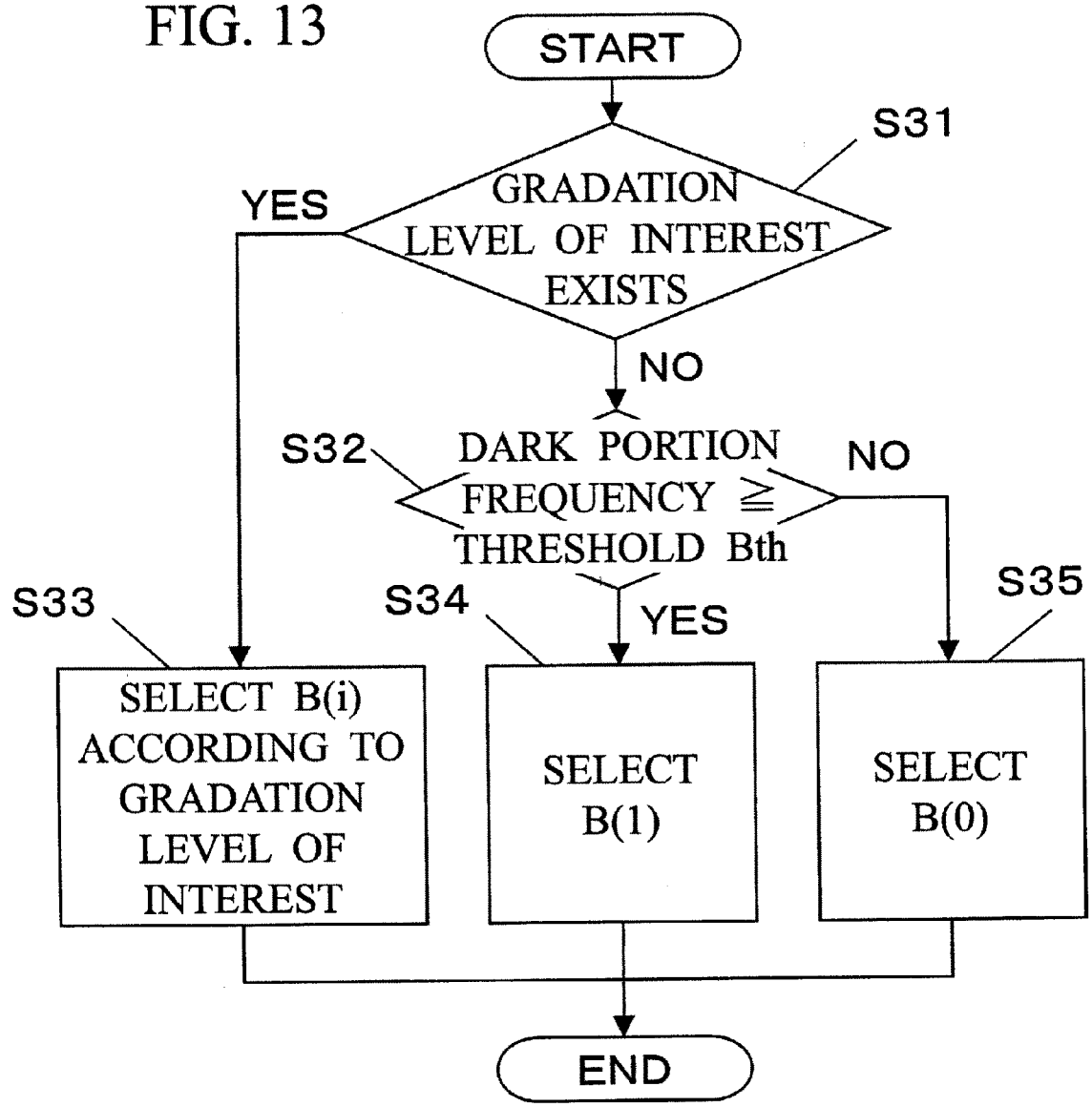
FIG. 13 is a flow chart depicting an example of a dark portion γ curve selection processing in Example 3.

The processing performed by the area γ curve selection unit 302 will now be described. In particular, the processing for selecting a dark portion γ curve (dark portion γ curve selection processing) will be described in detail. FIG. 13 is a flow chart depicting an example of the processing flow until the area γ curve selection unit 302 selects a dark portion γ curve.

The area γ curve selection unit 302 determines whether a gradation level of interest is detected by the gradation level of interest detection unit 102 (step S31). If the gradation level of interest is detected (step S31: YES), processing advances to step S33. If the gradation level of interest is not detected (step S31: NO), processing advances to step S32. In step S33, the gradation correction parameter is generated just like Example 2, and processing ends. In step S32, the area γ curve selection unit 302 compares the dark portion frequency calculated by the frequency calculation unit 301 and the threshold Bth. In other words, the darkness of the image in the divided area is determined.

According to the present example, the threshold Bth is assumed to be 1/16 of the total number of pixels in the area. In the present example, just like Example 1 and Example 2, 1920×1080 image is divided into 16 areas, so a total number of pixels in one divided area is 129600 pixels ((1920×1080)/16=129600). A value 1/16 of this total number of pixels, that is 8100, becomes the value of the threshold Bth. If the dark portion frequency equal to or more than the threshold Bth (e.g. dark portion frequency is 10000) (step S32: YES), the area γ curve selection unit 302 determines that the image in the processing target area is a dark image. Therefore, the area γ curve selection unit 302 selects the dark portion γ curve B (1) for improving the gradation characteristic in the low gradation level side, and ends processing (step S34). If the dark portion frequency is less than the threshold Bth (e.g. dark portion frequency is 1000) (step S32: NO), the area γ curve selection unit 302 determines that the image in the processing target area is not a dark image. Therefore, the area γ curve selection unit 302 selects the dark portion γ curve B (0), in which the gradation characteristic in the low gradation level side is not improved very much, and ends processing (step S35).

The processing for selecting a light portion γ curve is the same as the case of selecting a dark portion γ curve. In concrete terms, if a gradation level of interest is detected by the gradation level of interest detection unit 102, a gradation correction parameter is generated in the same manner as Example 2. If the gradation level of interest is not detected by the gradation level of interest detection unit 102, the light portion frequency and threshold are compared. If the light portion frequency equal to or more than the threshold, it is determined that the image in the processing target area is a light image, and a light portion γ curve for improving the gradation characteristic in the high gradation level side (e.g. light portion γ curve W (4)) is selected so as not to generate an overexposure. If the light portion frequency is less than the threshold, it is determined that the image in the processing target area is not a light image, and a light portion γ curve for not improving the gradation characteristic in the high gradation level side very much (e.g. light portion γ curve W (2)) is selected.

The interpolation unit 202 interpolates the brightness value that is output from the γ curve for each area, as shown in Example 2.

As mentioned above, according to the present example, a γ curve can be determined depending on the dark portion frequency or the light portion frequency, even if an image in which gradation level of interest cannot be detected, such as an animation image in which areas having a single color are combined, is input, so good contrast can be expressed.

In the present example, a case of the input image which is divided into a plurality of areas, just like Example 1 and Example 2, was described, but the configuration of the present example can be applied even if the input image is not divided. In concrete terms, a gradation correction parameter can be selected depending on the dark portion frequency or the light portion frequency of the entire image.

According to the present example, the gradation correction method was described using the method of Example 2, but the gradation may be corrected using the method of Example 1.

According to the present example, the dark portion γ curves B (1) and B (0) are selected depending on the dark portion frequency, and the light portion γ curves W (4) and W (2) are selected depending on the light portion frequency, but a γ curve to be selected is not limited to these curves. One of a plurality of prestored dark portion γ curves may be selected depending on the dark portion frequency, or one of a plurality of prestored light portion γ curves may be selected depending on the light portion frequency. According to the present example, five dark portion γ curves and five light portion γ curves are stored, but the numbers of these curves are not limited to these. Three dark portion γ curves and three light portion γ curves or ten dark portion γ curves and ten light portion γ curves may be stored. The number of the dark portion γ curves and the number of the light portion γ curves need not be the same. The γ curves need not be classified into a dark portion and light portion to be stored.

According to the present example, two γ curves are selected depending on the dark portion frequency and the light portion frequency respectively, but need not be selected in this way. The γ curve can be selected depending on at least the dark portion frequency, or the light portion frequency. If a γ curve is selected depending on the dark portion frequency, contrast in the dark portion can be expressed well. If a γ curve is selected depending on the light portion frequency, contrast in the light portion can be expressed well.

A case of using the brightness histogram was shown as an example, but the present example can be applied only if the histogram expresses the characteristics of the image, such as a histogram of which x axis is a gradation level of a pixel value other than the brightness value.

Example 4

Example 4 of the image processing apparatus and control method thereof according to an embodiment of the present invention will now be described. In concrete terms, a method for setting a gradation correction parameter appropriate for an input image, even if the image has 8-bit (256 categories) gradation in which the frequencies of the gradation level 0 and the gradation level 255 are high, is input, will be described.

Figure 15:
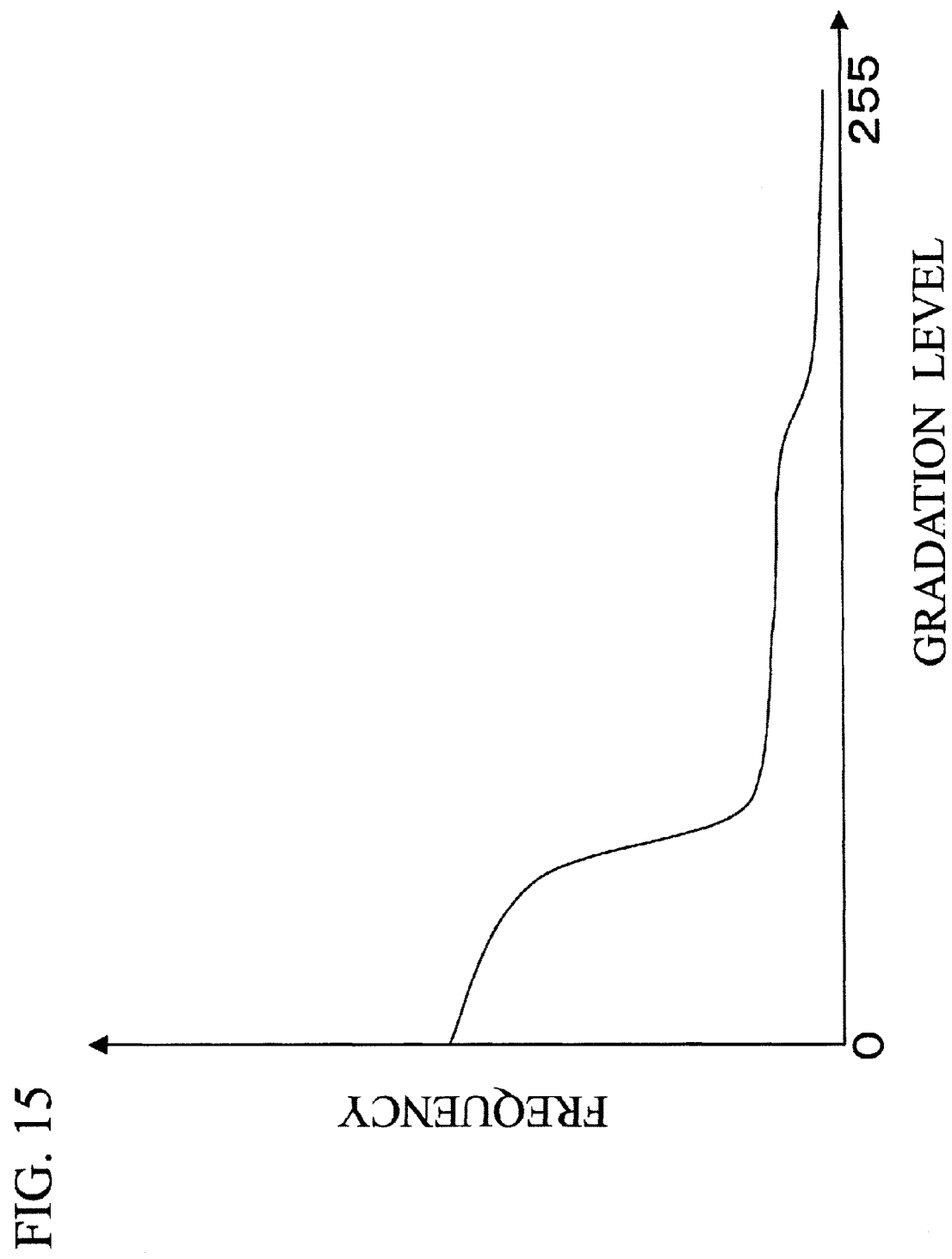
FIG. 15 is a diagram depicting an example of a brightness histogram of an image in which frequency of the gradation level 0 is high.

For example, when a night view is taken by a digital camera, an image in which frequency of the gradation level 0 is high, may be shot, and a brightness histogram as shown in FIG. 15 may be obtained. According to the methods described in Example 1 and Example 2, gradation levels 0 and 1 are removed from the search range when a dark portion gradation level of interest is searched. Because of this, in the case of a brightness histogram having a frequency peak in the gradation level 0, the gradation level 0 (or gradation around it) is not detected as the dark portion gradation level of interest, and therefore an underexposure is generated. For a light image (image having frequency peak in the gradation level 255) as well, the gradation characteristic in the light portion (gradation characteristic around the gradation level 255) cannot be improved, and therefore an overexposure is generated.

Figure 16:
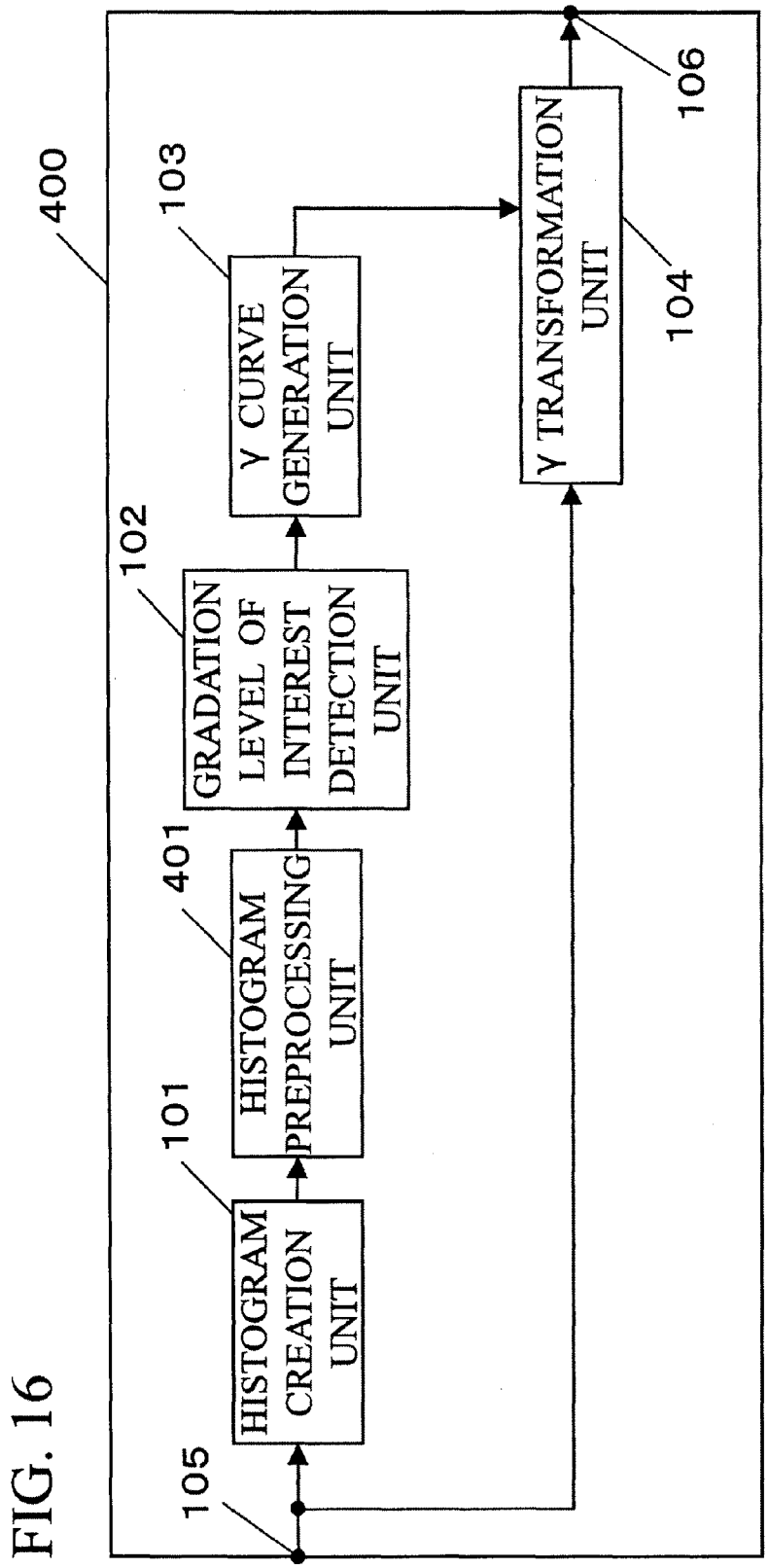
FIG. 16 is a block diagram depicting a functional configuration of an image processing apparatus according to Example 4.
Figure 18A:
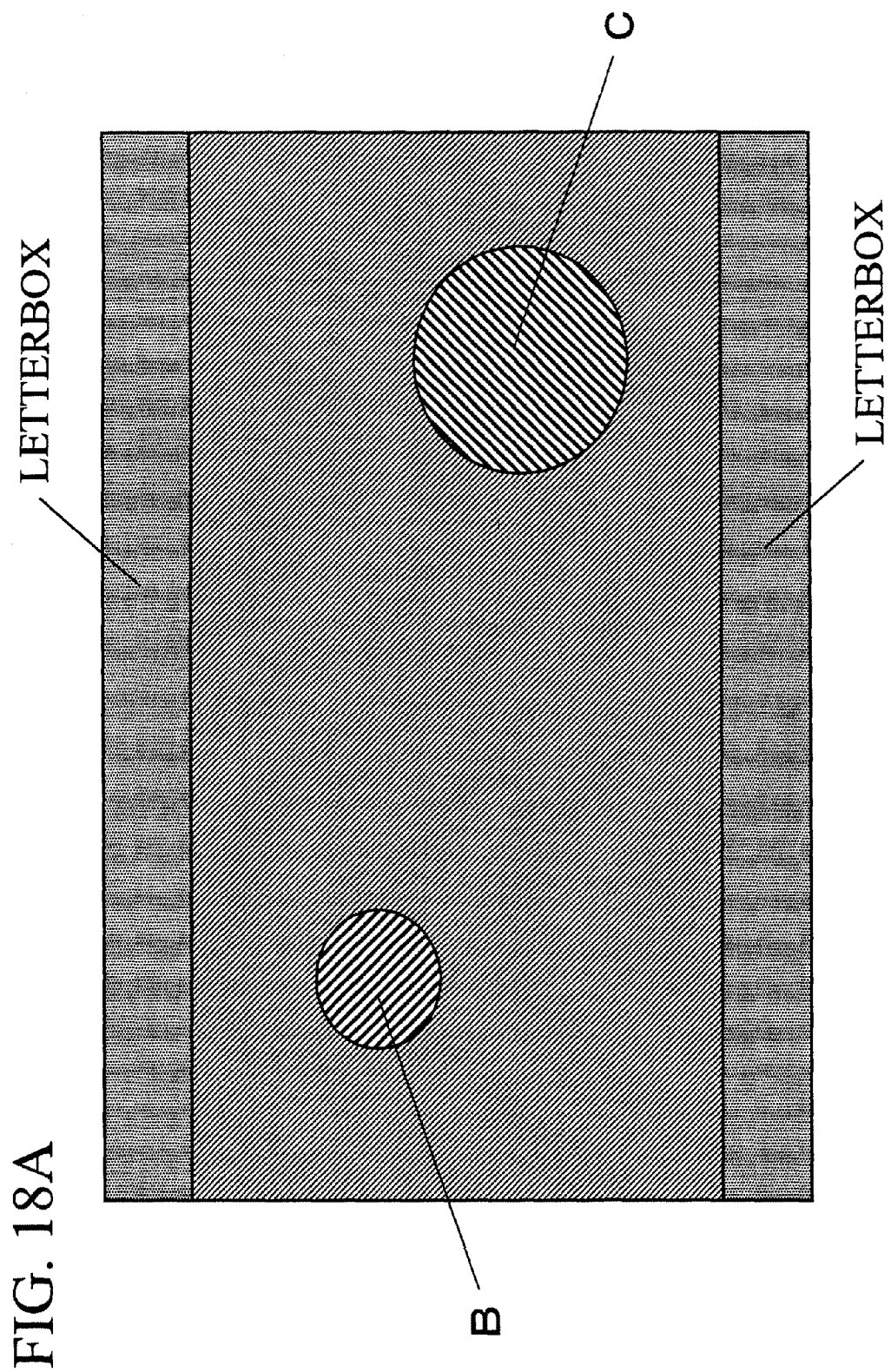
FIGS. 18A to 18C are diagrams depicting a prior art.
Figure 18B:
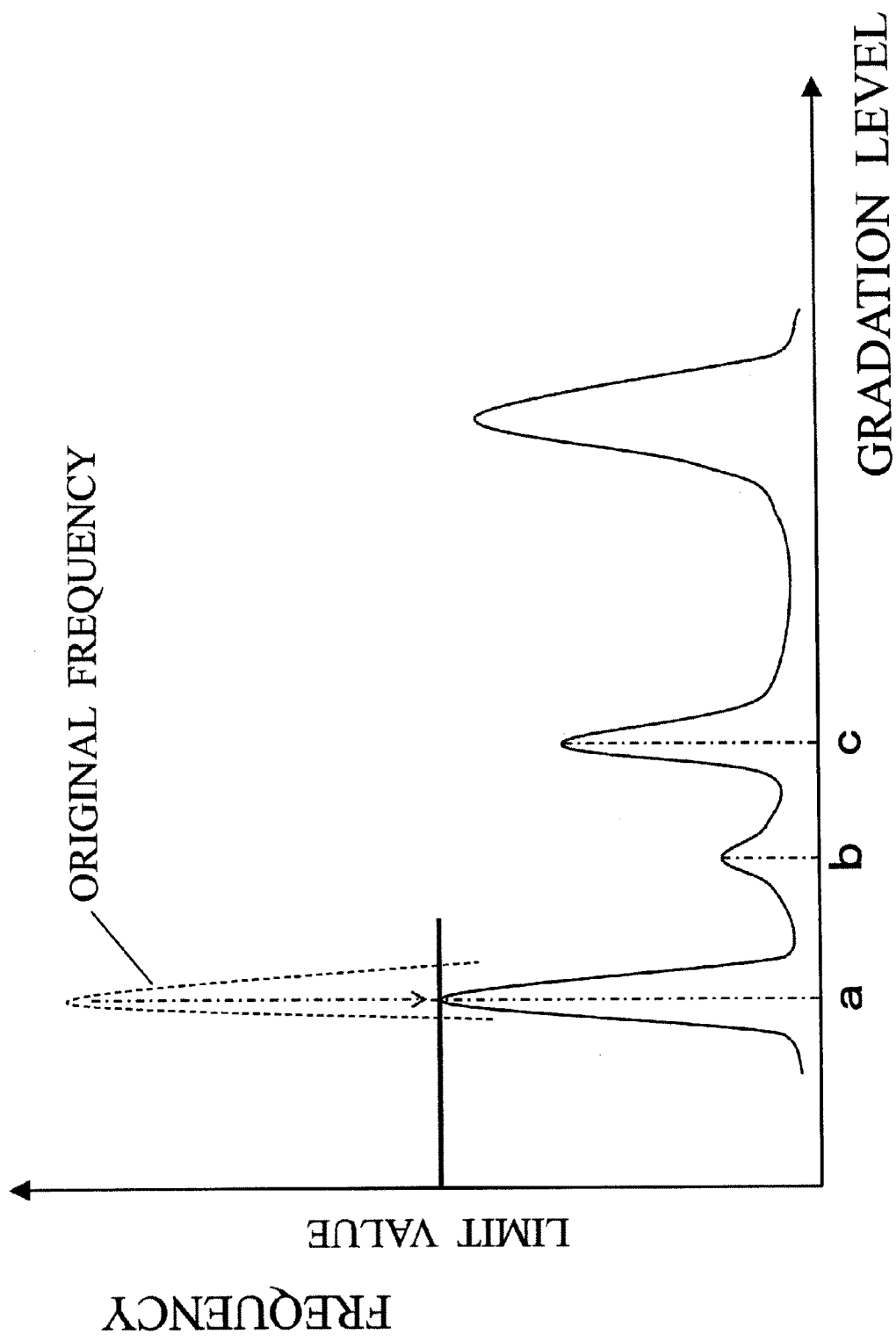
Figure 18C:
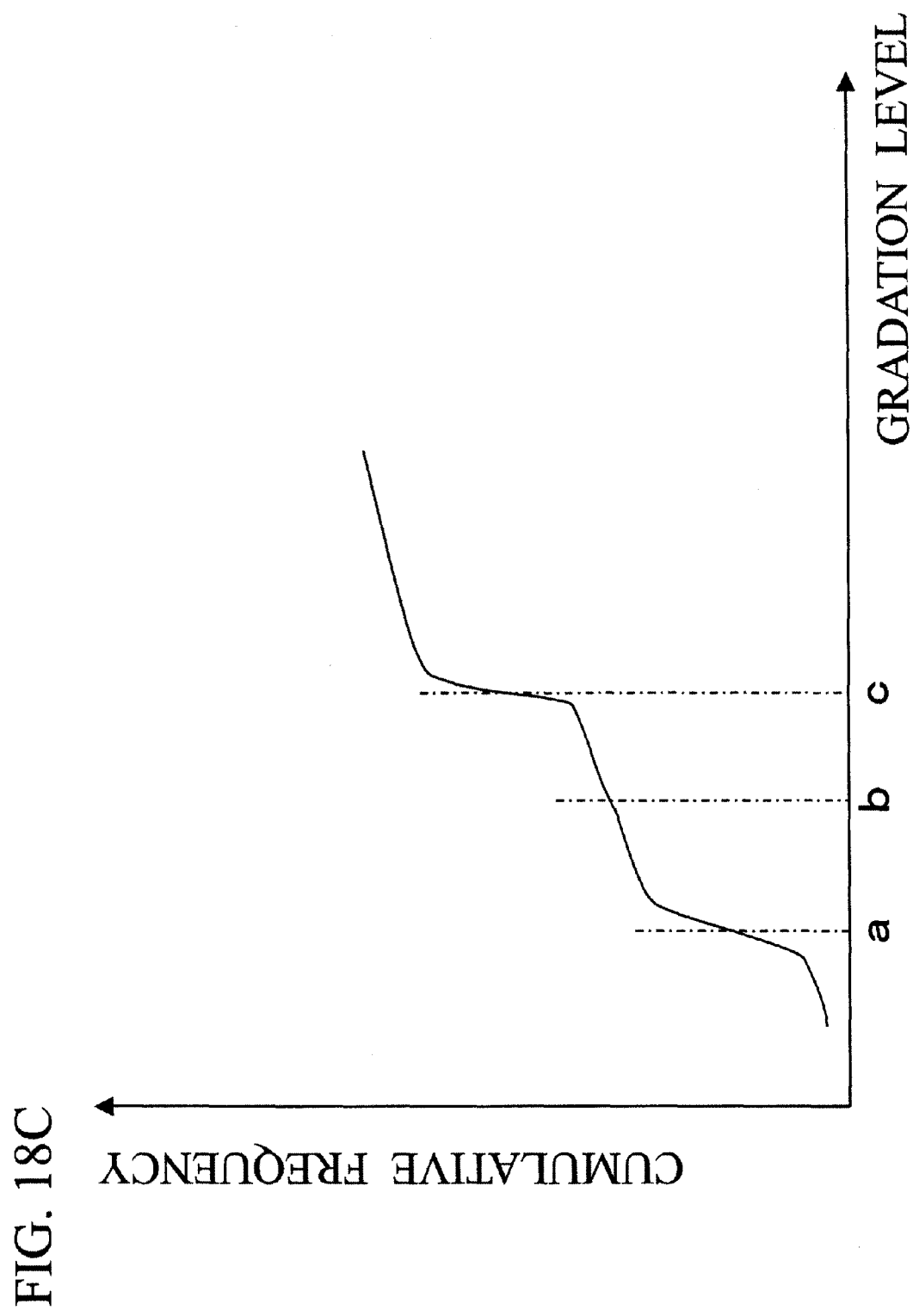

FIG. 16 is a block diaphragm depicting a functional configuration of an image processing apparatus according to the present example. As FIG. 16 shows, the image processing apparatus 400 according to the present example has a histogram creation unit 101, a histogram preprocessing unit 401, a gradation level of interest detection unit 102, a γ curve generation unit 103, a γ transformation unit 104, an input terminal 105, and an output terminal 106. A function the same as that of Example 1 is denoted with a same reference symbol, and a description thereof is omitted.

The histogram preprocessing unit 401 analyzes a brightness histogram created by the histogram creation unit 101, and outputs a brightness histogram after rewriting the data of the brightness histogram if the frequency of the gradation level 0 or gradation level 255 is high (histogram preprocessing unit). The gradation level of interest detection unit 102 detects a gradation level of interest from the data of the brightness histogram which is output from the histogram preprocessing unit 401. As described in Example 1, the gradation level of interest detection unit 102 classifies the gradation into a dark portion and a light portion, and detects a gradation level of interest of the dark portion (dark portion gradation level of interest) and a gradation level of interest of the light portion (light portion gradation level of interest) are detected.

A flow of rewriting processing for the gradation of the dark portion of the brightness histogram will now be described. FIG. 17A shows a frequency of each gradation level in the brightness histogram shown in FIG. 15. The histogram preprocessing unit 401 determines whether the frequency of the gradation level 0 is higher than the frequency of the gradation level 2. As FIG. 17A shows, if the frequency of the gradation level 0 (3500) is higher than the frequency of the gradation level 2 (2300), then the frequency of the gradation level 2 (2300) is rewritten to the frequency of the gradation level 0 (3500). FIG. 17B shows the data of the brightness histogram after being rewritten by the histogram preprocessing unit 401. If the frequency of the gradation level 0 is lower than the frequency of the gradation level 2, the histogram preprocessing unit 401 does not execute the processing to rewrite the frequency of the gradation level 2.

In the same manner, the histogram preprocessing unit 401 performs rewrite processing for the gradation in the dark portion of the brightness histogram. In concrete terms, the histogram preprocessing unit 401 determines whether the frequency of the gradation level 255 is higher than the frequency of the gradation level 253, and rewrites the frequency of the gradation level 253 to the frequency of the gradation level 255 if the frequency of the gradation level 255 is higher than the frequency of the gradation level 253. If the frequency of the gradation level 255 is not higher than the frequency of the gradation level 253, the histogram preprocessing unit 401 does not execute the processing to rewrite the frequency of the gradation level 253.

The gradation level of interest detection unit 102 performs processing to detect a gradation level of interest from the brightness histogram rewritten by the histogram preprocessing unit 401. Therefore even if an image which has a peak of frequency in the gradation level 0 or gradation level 255 is input, the gradation level of interest detection unit 102 can detect the gradation level 2 or gradation level 253 as the gradation level of interest.

As mentioned above, according to the present example, an appropriate γ curve (γ curve in which gradation level of interest is the gradation level 2 or gradation level 253) can be determined, even if the input image is an image having 8-bit gradation, in which frequency of the gradation level 0 (minimum gradation level) or gradation level 255 (maximum gradation level) is high. Hence a gradation correction parameter appropriate for the image can be used, and good contrast can be implemented. A case when an input image has 8-bit gradation was described above as an example, but the present invention can be applied regardless the number of bits of the gradation of the input image. In this example, a case of the gradation level of interest detection unit 102 comparing the frequency of the target gradation level and the frequencies of two gradation levels respectively for lower and higher sides of the gradation level, excluding this gradation level, was described, but the present invention is not limited to this. In other words, the present invention can also be applied to the case of comparing the frequency of the target gradation level with the frequencies of the respective n number of gradation levels (n is an integer of 1 or greater) at lower and higher sides of the gradation level, excluding this gradation level. If the frequency of the maximum gradation level (gradation level 0) is higher than the frequency of the gradation level of the minimum gradation level plus n, the histogram preprocessing unit 401 rewrites the frequency of the minimum gradation level plus n to the frequency of the minimum gradation level. If the frequency of the maximum gradation level (gradation level 255 in the case of an 8-bit gradation) is greater than the frequency of the gradation level of the maximum gradation level minus n, the histogram processing unit 401 rewrites the frequency of the gradation level of the maximum gradation level minus n to the frequency of the maximum gradation level. According to the present example, the correction method for gradation was described using the method of Example 1, but the gradation may be corrected using the method of Example 2. The present example can be applied to both the case of dividing the input image into a plurality of areas and creating the brightness histogram for each area, and the case of creating the brightness histogram for the entire input image without dividing the input image into a plurality of areas. If the input image is not divided, the gradation correction parameter is determined depending on the brightness histogram of the entire image.

The case of using the brightness histogram was described as an example, but the present example can be applied to any histogram that expresses the characteristics of the image, such as a histogram of which x axis is a gradation level of a pixel value other than brightness value.

The histogram preprocessing unit 401 may be able to set whether the function to rewrite the data of the brightness histogram is used or not. If it is set such that the function of the histogram preprocessing unit 401 is not used, the histogram generated by the histogram creation unit 101 is directly input to the gradation level of interest detection unit 102, as described in Example 1.

As described above, according to the image processing apparatus and the control method thereof according to Examples 1 to 4, a gradation level with which the gradation characteristic should be improved can be detected as a gradation level of interest. Thereby even if the frequency of the gradation level of interest is lower than the frequencies of the other gradation levels, a gradation correction parameter for improving the gradation characteristic in a gradation range around the gradation level of interest can be generated.

Examples 1 to 4 can be combined.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-154139, filed on Jun. 29, 2009, and Japanese Patent Application No. 2010-057700, filed on Mar. 15, 2010, which are hereby incorporated by reference herein in their entirety.

What is claimed is:

1. An image processing apparatus, comprising:
   a histogram creation unit configured to create a histogram from an input image;
   a detection unit configured to detect from the histogram, as a gradation level of interest, a gradation level whose frequency is a peak value, wherein a variation width of frequencies in a predetermined range including the gradation level of interest is smaller than a predetermined width;
   a gradation correction parameter generation unit configured to generate a gradation correction parameter having an input-output gradation conversion characteristic that improves a gradation characteristic in a predetermined gradation range including the gradation level of interest compared to other gradation ranges on the bases of the detected result by the detection unit; and
   a correction unit configured to correct the gradation of the image using the gradation correction parameter generated by the gradation correction parameter generation unit, wherein
   the detection unit determines whether the variation width of frequencies in the predetermined range is smaller than the predetermined width or not based on (1) a frequency of a gradation level that is a target for which it is to be determined whether the gradation level is a gradation level of interest or not, and (2) a value obtained by multiplying a total of frequencies of a respective n number of gradation levels, where n is an integer of 1 or greater, at lower and higher sides of the gradation level that is the target, excluding the gradation level that is the target, by a predetermined value.

2. The image processing apparatus according to claim 1, wherein when the frequency of the gradation level that is the target for which it is to be determined whether the gradation level is a gradation level of interest or not, is lower than the value obtained by multiplying the total of frequencies of the respective n number of gradation levels, where n is an integer of 1 or greater, at lower and higher sides of the gradation level that is the target, excluding the gradation level that is the target, by the predetermined value, the detection unit regards the variation width of the frequencies in the predetermined range as smaller than the predetermined width.

3. The image processing apparatus according to claim 1, further comprising:
   a histogram preprocessing unit configured to analyze a histogram created by the histogram creation unit, rewrite the frequency of a gradation level of a minimum gradation level plus n to a frequency of the minimum gradation level if the frequency of the minimum gradation level is higher than the frequency of the gradation level of the minimum gradation level plus n, and rewrite the frequency of a gradation level of a maximum gradation level minus n to a frequency of the maximum gradation level if the frequency of the maximum gradation level is higher than the frequency of the gradation level of the maximum gradation level minus n.

4. The image processing apparatus according to claim 1, wherein when a plurality of gradation levels, each of which has a frequency being a peak value, and has a variation width of frequencies in the predetermined range including the gradation level to be smaller than the predetermined width, exist in the histogram, the detection unit detects at least a gradation level in the lowest gradation level side, out of the plurality of gradation levels, as the gradation level of interest.

5. The image processing apparatus according to claim 1, wherein when a plurality of gradation levels, each of which has a frequency being a peak value, and has a variation width of frequencies in the predetermined range including the gradation level to be smaller than the predetermined width, exist in the histogram, the detection unit detects at least a gradation level in the highest gradation level side, out of the plurality of gradation levels, as the gradation level of interest.

6. A controlling method of an image processing apparatus, comprising:
   a histogram creation step of creating a histogram from an input image;
   a detection step of detecting from the histogram, as a gradation level of interest, a gradation level whose frequency is a peak value, wherein a variation width of frequencies in a predetermined range including the gradation level of interest is smaller than a predetermined width;
   a gradation correction parameter generation step of generating a gradation correction parameter having an input-output gradation conversion characteristic that improves a gradation characteristic in a predetermined gradation range including the gradation level of interest compared to other gradation ranges on the bases of the detected result by the detection step; and
   a correction step of correcting the gradation of the image using the gradation correction parameter generated by the gradation correction parameter generation step, wherein the detection step determines whether the variation width of frequencies in the predetermined range is smaller than the predetermined width or not based on (1) a frequency of a gradation level that is a target for which it is to be determined whether the gradation level is a gradation level of interest or not, and (2) a value obtained by multiplying a total of frequencies of a respective n number of gradation levels, where n is an integer of 1 or greater, at lower and higher sides of the gradation level that is the target, excluding the gradation level that is the target, by a predetermined value.

7. The controlling method of the image processing apparatus according to claim 6, wherein when the frequency of the gradation level that is the target for which it is determined whether the gradation level is the gradation level of interest or not, is lower than the value obtained by multiplying the total of frequencies of the respective n number of gradation levels, where n is an integer of 1 or greater, at lower and higher sides of the gradation level that is the target, excluding the gradation level that is the target, by the predetermined value, in the detection step, it is regarded that the variation width of the frequencies in the predetermined range is smaller than the predetermined width.

8. The controlling method of the image processing apparatus according to claim 6, further comprising:
a histogram preprocessing step of analyzing a histogram created by the histogram creation step, rewriting the frequency of a gradation level of a minimum gradation level plus n to a frequency of the minimum gradation level if the frequency of the minimum gradation level is higher than the frequency of the gradation level of the minimum gradation level plus n, and rewriting the frequency of a gradation level of a maximum gradation level minus n to a frequency of the maximum gradation level if the frequency of the maximum gradation level is higher than the frequency of the gradation level of the maximum gradation level minus n.

9. The controlling method of the image processing apparatus according to claim 6, wherein when a plurality of gradation levels, each of which has frequency being a peak value, and has a variation width of frequencies in the predetermined range including the gradation level to be smaller than the predetermined width, exist in the histogram, in the detection step, at least a gradation level in the lowest gradation level side out of the plurality of gradation levels is detected as the gradation level of interest.

10. The controlling method of the image processing apparatus according to claim 6, wherein when a plurality of gradation levels, each of which has frequency being a peak value, and has a variation width of frequencies in the predetermined range including the gradation level to be smaller than the predetermined width, exist in the histogram, in the detection step, at least a gradation level in the highest gradation level side out of the plurality of gradation levels is detected as the gradation level of interest.

11. The image processing apparatus according to claim 1, further comprising:
a storage unit configured to store a plurality of predetermined gradation correction parameters; and
a calculation unit configured to calculate the total of frequencies from a minimum gradation level to a predetermined gradation level of the histogram, as a frequency in a low gradation level side, wherein
when the gradation level of interest is not detected by the detection unit, the gradation correction parameter generation unit selects any of the plurality of predetermined gradation correction parameters depending on the frequency in the low gradation level side, and
the correction unit corrects the gradation of the image using the selected gradation correction parameter.

12. The image processing apparatus according to claim 1, further comprising:
a storage unit configured to store a plurality of predetermined gradation correction parameters; and
a calculation unit configured to calculate the total of frequencies from a predetermined gradation level to a maximum gradation level of the histogram, as a frequency in a high gradation level side, wherein
when the gradation level of interest is not detected by the detection unit, the gradation correction parameter generation unit selects any of the plurality of predetermined gradation correction parameters depending on the frequency in the high gradation level side, and
the correction unit corrects the gradation of the image using the selected gradation correction parameter.

13. The image processing apparatus according to claim 1, wherein the gradation correction parameter generation unit generates, as the gradation correction parameter, a γ curve having an input-output gradation conversion characteristic that improves a gradation characteristic in the predetermined gradation range including the gradation level of interest compared to the other gradation ranges.

14. The controlling method of the image processing apparatus according to claim 6, further comprising:
a storage step of storing a plurality of predetermined gradation correction parameters; and
a calculation step of calculating a total of frequencies from a minimum gradation level to a predetermined gradation level of the histogram, as a frequency in a low gradation level side, wherein
when the gradation level of interest is not detected by the detection step, in the gradation correction parameter generation step, any of the plurality of predetermined gradation correction parameters is selected depending on the frequency in the low gradation level side, and
in the correction step, the gradation of the image is corrected using the selected gradation correction parameter.

15. The controlling method of the image processing apparatus according to claim 6, further comprising:
a storage step of storing a plurality of predetermined gradation correction parameters; and
a calculation step of calculating a total of frequencies from a predetermined gradation level to a maximum gradation level of the histogram, as a frequency in a high gradation level side, wherein when the gradation level of interest is not detected by the detection step, in the gradation correction parameter generation step, any of the plurality of predetermined gradation correction parameters is selected depending on the frequency in the high gradation level side, and
in the correction step, the gradation of the image is corrected using the selected gradation correction parameter.

16. The controlling method of the image processing apparatus according to claim 6, wherein in the gradation correction parameter generation step, a γ curve having an input-output gradation conversion characteristic that improves a gradation characteristic in the predetermined gradation range including the gradation level of interest compared to the other gradation ranges is generated as the gradation correction parameter.

17. An image processing apparatus, comprising:
a histogram creation unit configured to divide an input image into a plurality of areas, and create a histogram for each area;
a detection unit configured to detect from the histogram of each of the areas, as a gradation level of interest, a gradation level whose frequency is a peak value, wherein a variation width of frequencies in a predetermined range including the gradation level of interest is smaller than a predetermined width;
a gradation correction parameter generation unit configured to generate, for each of the areas, a gradation correction parameter having an input-output gradation conversion characteristic that improves a gradation characteristic in a predetermined gradation range including the gradation level of interest of the each area compared to other gradation ranges on the bases of the detected result by the detection unit; and
a correction unit configured to correct the gradation of the image by, for each pixel, using a gradation correction parameter generated for a first area to which the pixel belongs, a gradation correction parameter generated for a second area adjacent to the first area, and weights based on a positional relationship between the pixel and the first area and a positional relationship between the pixel and the second area.

18. The image processing apparatus according to claim 17, wherein the correction unit corrects the gradation of the image by combining, for each pixel, a pixel value which is calculated using the gradation correction parameter generated for the first area to which the pixel belongs, and a pixel value which is calculated using the gradation correction parameter generated for the second area adjacent to the first area, using weights based on the positional relationship between the pixel and the first area and the positional relationship between the pixel and the second area.

19. The image processing apparatus according to claim 17, wherein when a plurality of gradation levels, each of which has a frequency being a peak value, and has a variation width of frequencies in the predetermined range including the gradation level to be smaller than the predetermined width, exist in the histogram, the detection unit detects at least a gradation level in the lowest gradation level side, out of the plurality of gradation levels, as the gradation level of interest.

20. The image processing apparatus according to claim 17, wherein when a plurality of gradation levels, each of which has a frequency being a peak value, and has a variation width of frequencies in the predetermined range including the gradation level to be smaller than the predetermined width, exist in the histogram, the detection unit detects at least a gradation level in the highest gradation level side, out of the plurality of gradation levels, as the gradation level of interest.

21. The image processing apparatus according to claim 17, wherein the gradation correction parameter generation unit generates, as the gradation correction parameter, a γ curve having an input-output gradation conversion characteristic that improves a gradation characteristic in the predetermined gradation range including the gradation level of interest compared to the other gradation ranges.

22. A controlling method of an image processing apparatus, comprising:
a histogram creation step of dividing an input image into a plurality of areas, and creating a histogram for each area;
a detection step of detecting from the histogram of each of the areas, as a gradation level of interest, a gradation level whose frequency is a peak value, wherein a variation width of frequencies in a predetermined range including the gradation level of interest is smaller than a predetermined width;
a gradation correction parameter generation step of generating, for each of the areas, a gradation correction parameter having an input-output gradation conversion characteristic that improves a gradation characteristic in a predetermined gradation range including the gradation level of interest of the each area compared to other gradation ranges on the bases of the detected result by the detection step; and
a correction step of correcting the gradation of the image by, for each pixel, using a gradation correction parameter generated for a first area to which the pixel belongs, a gradation correction parameter generated for a second area adjacent to the first area, and weights based on a positional relationship between the pixel and the first area and a positional relationship between the pixel and the second area.

23. The controlling method of the image processing apparatus according to claim 22, wherein in the correction step, the gradation of the image is corrected by combining, for each pixel, a pixel value which is calculated using the gradation correction parameter generated for the first area to which the pixel belongs, and a pixel value which is calculated using the gradation correction parameter generated for the second area adjacent to the first area, using weights based on the positional relationship between the pixel and the first area and the positional relationship between the pixel and the second area.

24. The controlling method of the image processing apparatus according to claim 22, wherein when a plurality of gradation levels, each of which has a frequency being a peak value, and has a variation width of frequencies in the predetermined range including the gradation level to be smaller than the predetermined width, exist in the histogram, in the detection step, at least a gradation level in the lowest gradation level side out of the plurality of gradation levels is detected as the gradation level of interest.

25. The controlling method of the image processing apparatus according to claim 22, wherein when a plurality of gradation levels, each of which has a frequency being a peak value, and has a variation width of frequencies in the predetermined range including the gradation level to be smaller than the predetermined width, exist in the histogram, in the detection step, at least a gradation level in the highest gradation level side out of the plurality of gradation levels is detected as the gradation level of interest.

26. The controlling method of the image processing apparatus according to claim 22, wherein in the gradation correction parameter generation step, a γ curve having an input-output gradation conversion characteristic that improves a gradation characteristic in the predetermined gradation range including the gradation level of interest compared to the other gradation ranges is generated as the gradation correction parameter.

* * * * *